US012181623B2

(12) United States Patent
Wang et al.

(10) Patent No.: US 12,181,623 B2
(45) Date of Patent: Dec. 31, 2024

(54) COUPLING A SIMULATOR AND AT LEAST ONE OTHER SIMULATOR

(71) Applicant: CHEVRON U.S.A. INC., San Ramon, CA (US)

(72) Inventors: Bin Wang, Katy, TX (US); Yifan Zhou, Spring, TX (US); Kon-Ming Gary Li, Sugar Land, TX (US); Baris Guyaguler, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 652 days.

(21) Appl. No.: 16/816,333

(22) Filed: Mar. 12, 2020

(65) Prior Publication Data

US 2020/0294413 A1 Sep. 17, 2020

Related U.S. Application Data

(60) Provisional application No. 62/817,337, filed on Mar. 12, 2019.

(51) Int. Cl.
*G01V 1/30* (2006.01)
*G01V 20/00* (2024.01)
(Continued)

(52) U.S. Cl.
CPC ............. *G01V 1/306* (2013.01); *G01V 20/00* (2024.01); *G09B 23/06* (2013.01); *G09B 23/40* (2013.01); *E21B 41/00* (2013.01); *G01V 2210/66* (2013.01)

(58) Field of Classification Search
CPC .. G01V 1/306; G01V 99/005; G01V 2210/66; G01V 99/00; G09B 23/06;
(Continued)

(56) References Cited

U.S. PATENT DOCUMENTS 7,277,836 B2   10/2007   Netemeyer et al.
7,617,082 B2   11/2009   Childs et al.
(Continued)

FOREIGN PATENT DOCUMENTS

EP   1944663   7/2008
EP   3264357   1/2018

OTHER PUBLICATIONS

Rin et al. "General Implicit Coupling Framework for Multi-Physics Problems" SPE Reservoir Simulation Conference held in Montgomery, TX, USA, Feb. 20-22, 2017. (Year: 2017).*
(Continued)

*Primary Examiner* — Rehana Perveen
*Assistant Examiner* — Troy A Maust

(57) ABSTRACT

Embodiments of methods, systems, and computer-readable media for coupling two or more simulators to simulate a coupled multi-physics model of a subsurface formation are provided. A coupling framework loads one or more simulators as shared libraries into a common process and a common memory space with a first simulator to create the coupled multi-physics model of the subsurface formation. During simulation, the coupling framework controls data exchange between the first simulator and the other simulator(s) through the common memory space and controls execution of the first simulator and the other simulator(s) responsive to the common process. In the event of two-way coupling, the coupling framework can receive feedback from the other simulator(s) and alter execution of the first simulator. In the event of grid misalignment, the coupling framework can map data between the first simulator and the other simulator(s) such as in a globally conservative (e.g., mass, energy, etc.) manner.

21 Claims, 7 Drawing Sheets

(51) Int. Cl.
  *G09B 23/06* (2006.01)
  *G09B 23/40* (2006.01)
  *E21B 41/00* (2006.01)
(58) Field of Classification Search
  CPC ..... G09B 23/40; E21B 41/00; E21B 2200/20; E21B 33/00; E21B 41/0092; E21B 41/0099
  USPC .......................................................... 703/10
  See application file for complete search history.

(56) References Cited

U.S. PATENT DOCUMENTS

| | | | |
|---|---|---|---|
| 7,707,018 | B2 | 4/2010 | Shaw |
| 7,761,270 | B2 | 7/2010 | Banki et al. |
| 8,204,727 | B2 | 6/2012 | Dean et al. |
| 8,280,709 | B2 | 10/2012 | Koutsabeloulis et al. |
| 8,401,832 | B2 | 3/2013 | Ghorayeb et al. |
| 8,548,783 | B2 | 10/2013 | Dean et al. |
| 8,805,660 | B2 | 8/2014 | Guyaguler et al. |
| 9,026,419 | B2 | 5/2015 | Dean et al. |
| 9,703,006 | B2 | 7/2017 | Stern et al. |
| 2020/0190967 | A1* | 6/2020 | Gooneratne ....... G05B 19/4155 |

OTHER PUBLICATIONS

Zhou "Parallel General-Purpose Reservoir Simulation With Coupled Reservoir Models and Multisegment Wells", Nov. 2012 (Year: 2012).*
Fung et al. "Multiparadigm Parallel Acceleration for Reservoir Simulation" SPE Reservoir Simulation Symposium, The Woodlands, Texas, USA, Feb. 18-20, 2013, (Year: 2013).*
Stevens et al. "Mitigating Error and Uncertainty in Partitioned Analysis: A Review of Verification, Calibration and Validation Methods for Coupled Simulations", Arch Computat Methods Eng (2017) 24:557-571 (Year: 2017).*
Petroleum Experts, "IPM Suite Product Information", 2018. Retrieved from https://www.petex.com/media/3040/ipm-brochure-sept-20_lores.pdf on Jun. 1, 2023 (Year: 2018).*
"Simulation Definition and Meaning", Retrieved from https://www.dictionary.com/browse/simulation on Jun. 2, 2023 (Year: 2023).*
Dean, R.H., et al.; "A Comparison of Techniques for Coupling Porous Flow and Geomechanics"; (2006), SPE 79709, pp. 132-140.
Donatti, C.N., et al.; "Simulator Capability Extension Using a Dynamic Load Library to Enable H2S Reactions in Thermal EOR"; (2016), SPE 181192-MS, pp. 1-17.
Kim, Jihoon, et al.; "Formulation and Sequential Numerical Algorithms of Coupled Fluid/Heat Flow and Geomechanics for Multiple Porosity Materials"; (2012), International Journal for Numerical Methods in Engineering, pp. 1-32.
Kim, J., et al.; "Stability, Accuracy, and Efficiency of Sequential Methods for Coupled Flow and Geomechanics"; (2011), SPE 119084, pp. 249-262.
Li, Gary, et al.; "Simulation of Radio Frequency Heating of Heavy Oil Reservoir Using Multi-Physics Coupling of Reservoir Simulation with Electromagnetic Solver"; (2019), SPE 193836-MS, pp. 1-23.
Minkoff, Susan E., et al.; "Coupled Geomechanics and Flow Simulation for Time-Lapse Seismic Modeling"; (2004), Geophysics, vol. 69, No. 1, pp. 200-211.
Tran, David, et al.; "Improved Gridding Technique for Coupling Geomechanics to Reservoir Flow"; (2010), SPE 115514, pp. 64-75.
Tran, David, et al.; "New Iterative Coupling Between a Reservoir Simulator and a Geomechanics Module"; (2004), SPE 88989, pp. 362-369.
Bernstein, Gilbert; "Cork Boolean Library", (2007), Article, 3 pages.
Centler, Florian, et al.; "GeoSysBRNS-A Flexible Multidimensional Reactive Transport Model for Simulating Biogeochemical Subsurface Processes"; (2010), Computers & Geosciences, vol. 36, pp. 397-405.
Dean, R.H., et al.; "Hydraulic Fracture Predictions with a Fully Coupled Geomechanical Reservoir Simulator"; (Sep. 2008), SPE 116470, pp. 1-12.
Donatti, C.N., et al.; "Simulator Capability Extension Using a Dynamic Load Library to Enable H2S Reactions in Thermal EOR"; (Oct. 2016), SPE-181192-MS, pp. 1-17.
Mikelic, Andro, et al.; "Numerical Convergence Study of Iterative Coupling for Coupled Flow and Geomechanics"; (Jan. 2014), Computational Geosciences, vol. 18, pp. 325-341.
Zuluaga, E., et al.; "The Use of a Fully Coupled Geomechanics-Reservoir Simulator to Evaluate the Feasibility of a Cavity Completion"; (Nov. 2007), SPE 109588, pp. 1-6.
Extended European Search Report, issued on Jul. 30, 2020, during the prosecution of European Application No. 20162597.7.
Centler, Florian, et al.; "GeoSysBRNS—A Flexible Multidimensional Reactive Transport Model for Simulating Biogeochemical Subsurface Processess"; (2010), Computers & Geosciences, vol. 36, pp. 397-405.
Canadian Office Action, issued on Nov. 20, 2023, during the prosecution of Canadian Application No. 3,075,373.

* cited by examiner

COUPLING A SIMULATOR AND AT LEAST ONE OTHER SIMULATOR

CROSS REFERENCES TO RELATED APPLICATIONS

This application claims benefit of U.S. Provisional Application No. 62/817,337, filed Mar. 12, 2019, which is hereby incorporated by reference in its entirety.

TECHNICAL FIELD

The present disclosure relates to simulations in the hydrocarbon industry, and more particularly to, coupling simulators to perform simulations in the hydrocarbon industry.

BACKGROUND

The hydrocarbon industry retrieves hydrocarbons that are trapped in subsurface reservoirs. These hydrocarbons can be recovered by drilling wells into the reservoirs such that hydrocarbons are able to flow from the reservoirs into the wellbores and up to the surface. The geology of a reservoir has a large impact on the production rate at which hydrocarbons are able to flow into a wellbore. A large amount of effort has therefore been dedicated to developing reservoir characterization and simulation techniques to better predict how fluid will flow within a reservoir. Effort has been dedicated to coupling a reservoir simulator with an external simulator to extend the simulation capabilities of the reservoir simulator. Three approaches have been traditionally utilized to couple the reservoir simulator and the external simulator.

The first approach involves manual integration of the external simulator's code into the reservoir simulator's code. This manual approach effectively turns multiple simulators into one simulator. The manual integration is a very intrusive process and typically requires a massive amount of implementation effort. Furthermore, this approach lacks the flexibility to use different meshes, discretization techniques, and linear solvers for different physical sub-problems and to couple with additional physics later on. The entire system typically becomes overly complex and very difficult to maintain. It is also difficult to diagnose problems when they occur.

The second approach keeps the reservoir simulator and the external simulator as separate entities and relies on hard drives for data exchange. For example, the second approach couples the simulators with data exchanged using files written to and read from hard drives. The second approach is not intrusive, but it is very inefficient and not scalable due to (a) the costly data gathering/scattering to/from the master process on the network, (b) slow data exchange via hard drives, and (c) frequently required stop and restart of simulation in each simulator. Because this second approach is inefficient and not scalable, reservoir and external simulator models often need to be simplified for coupling purposes. In addition, the allowable coupling schemes are limited to one-way and two-way explicit coupling. Two-way iterative coupling is often not possible with this second approach because of excessive data exchange through file input/output (I/O).

The third approach uses a separate controller between the reservoir simulator and other simulators to coordinate coupling and data exchange. Each stand-alone simulator communicates with an adapter/client of the controller and each adapter/client communicates with the centralized server of the controller through socket. As different simulators run on different machines and they need to solve sub-problems of the coupled system sequentially, this third approach typically leads to idling of one simulator and its host machines while another simulator is solving its sub-problem. Therefore, this third approach typically uses computation resources very inefficiently. Moreover, data exchange is typically done only through the network.

Thus, there exists a need in the area of simulations in the hydrocarbon industry, and more particularly, coupling simulators to perform the simulations in the hydrocarbon industry.

SUMMARY

Embodiments of coupling two or more simulators to simulate a coupled multi-physics model of a subsurface formation are provided herein.

One embodiment of a method of coupling a first simulator and a second simulator to simulate a coupled multi-physics model of a subsurface formation, where the first simulator comprises a first physics model and the second simulator comprises a second physics model. The second simulator is loaded, by a coupled framework, as a library into a common process and a common memory space with the first simulator to create the coupled multi-physics model of the subsurface formation. The embodiment of the method further comprises simulating, by the first simulator and the library corresponding to the second simulator that are coupled by the coupling framework during the simulating step, the coupled multi-physics model of the subsurface formation to generate a solution satisfying the first physics model, the second physics model, and interaction between the first physics model and the second physics model. The coupled multi-physics model is comprised of the first physics model, the second physics model, and the interaction between the first physics model and the second physics model. The coupling framework performs the following during the simulating step to couple the first simulator and the library corresponding to the second simulator: (i) controls data exchange between the first simulator and the second simulator through the common memory space, and (ii) controls execution of the first simulator and the second simulator responsive to the common process. In some embodiments, the coupling framework loads the second simulator as the shared library into a plurality of common processes and a plurality of common memory spaces with the first simulator. In some embodiments, the coupling framework alters execution of the first simulator responsive to feedback from the second simulator in the event of two-way explicit coupling, two-way iterative coupling, or any combination thereof. In some embodiments, the coupling framework maps data between the first simulator and the second simulator in the event of grid misalignment, such as in a globally conservative (e.g., mass, energy, etc.) manner.

One embodiment of a system of coupling a first simulator and a second simulator to simulate a coupled multi-physics model of a subsurface formation, where the first simulator comprises a first physics model and the second simulator comprises a second physics model. The system comprises a processor and a memory communicatively connected to the processor. The memory stores a first simulator in a process and a memory space. The memory stores computer-executable instructions which, when executed, cause the processor to perform loading, by a coupling framework, the second simulator as a library into the process and the memory space of the first simulator to ensure that the first simulator and the second simulator share a common process and a common memory space. The memory stores computer-executable instructions which, when executed, cause the processor to perform simulating, by the first simulator and the library corresponding to the second simulator that are coupled by the coupling framework during the simulating step, a coupled multi-physics model of the subsurface formation to generate a solution satisfying the first physics model, the second physics model, and interaction between the first physics model and the second physics model. The coupled multi-physics model is comprised of the first physics model, the second physics model, and the interaction between the first physics model and the second physics model. The coupling framework performs the following during the simulation step to couple the first simulator and the library corresponding to the second simulator: (i) controls data exchange between the first simulator and the second simulator through the common memory space, and (ii) controls execution of the first simulator and the second simulator responsive to the common process. In some embodiments, the coupling framework loads the second simulator as the shared library into a plurality of common processes and a plurality of common memory spaces with the first simulator. In some embodiments, the coupling framework alters execution of the first simulator responsive to feedback from the second simulator in the event of two-way explicit coupling, two-way iterative coupling, or any combination thereof. In some embodiments, the coupling framework maps data between the first simulator and the second simulator in the event of grid misalignment, such as in a globally conservative (e.g., mass, energy, etc.) manner.

One embodiment of a computer-readable medium having computer-executable instructions stored thereon which, when executed by a first simulator, cause the first simulator to perform a method of coupling the first simulator and a second simulator to simulate a coupled multi-physics model of a subsurface formation. The first simulator comprises a first physics model and the second simulator comprises a second physics model. The computer-executable instructions load the second simulator as a library into a common process and a common memory space with the first simulator. The computer-executable instructions cause the first simulator to simulate the coupled multi-physics model of the subsurface formation to generate a solution satisfying the first physics model, the second physics model, and interaction between the first physics model and the second physics model. The coupled multi-physics model is comprised of the first physics model, the second physics model, and the interaction between the first physics model and the second physics model. The coupling framework performs the following during the simulation step to couple the first simulator and the library corresponding to the second simulator: (i) controls data exchange between the first simulator and the second simulator through the common memory space, and (ii) controls execution of the first simulator and the second simulator responsive to the common process. In some embodiments, the coupling framework loads the second simulator as the shared library into a plurality of common processes and a plurality of common memory spaces with the first simulator. In some embodiments, the coupling framework alters execution of the first simulator responsive to feedback from the second simulator in the event of two-way explicit coupling, two-way iterative coupling, or any combination thereof. In some embodiments, the coupling framework maps data between the first simulator and the second simulator in the event of grid misalignment, such as in a globally conservative (e.g., mass, energy, etc.) manner.

Figure 1A:
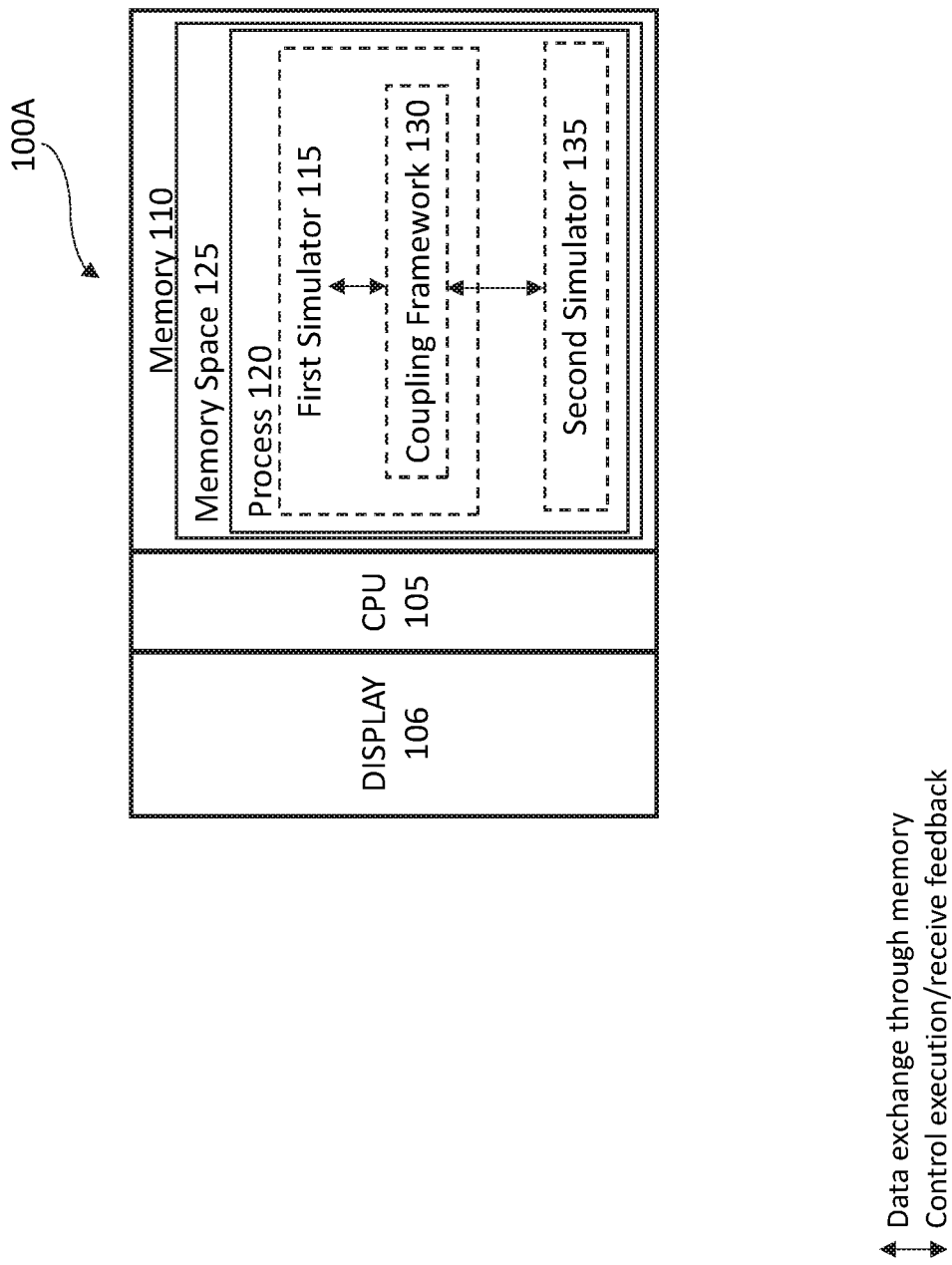
FIG. 1A illustrates one embodiment of a system of coupling a first simulator and a second simulator to simulate, in serial, a coupled multi-physics model of a subsurface formation.

Reference will now be made in detail to various embodiments, where like reference numerals designate corresponding parts throughout the several views. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatuses have not been described in detail so as not to unnecessarily obscure aspects of the embodiments.

DETAILED DESCRIPTION

TERMINOLOGY: The following terms will be used throughout the specification and will have the following meanings unless otherwise indicated.

Formation: Hydrocarbon exploration processes, hydrocarbon recovery (also referred to as hydrocarbon production) processes, or any combination thereof may be performed on a formation. The formation refers to practically any volume under a surface. For example, the formation may be practically any volume under a terrestrial surface (e.g., a land surface), practically any volume under a seafloor, etc. A water column may be above the formation, such as in marine hydrocarbon exploration, in marine hydrocarbon recovery, etc. The formation may be onshore. The formation may be offshore (e.g., with shallow water or deep water above the formation). The formation may include faults, fractures, overburdens, underburdens, salts, salt welds, rocks, sands, sediments, pore space, etc. Indeed, the formation may include practically any geologic point(s) or volume(s) of interest (such as a survey area) in some embodiments.

The formation may include hydrocarbons, such as liquid hydrocarbons (also known as oil or petroleum), gas hydrocarbons (e.g., natural gas), solid hydrocarbons (e.g., asphaltenes or waxes), a combination of hydrocarbons (e.g., a combination of liquid hydrocarbons, gas hydrocarbons, and solid hydrocarbons), etc. Light crude oil, medium oil, heavy crude oil, and extra heavy oil, as defined by the American Petroleum Institute (API) gravity, are examples of hydrocarbons. Examples of hydrocarbons may include oil, natural gas, kerogen, bitumen, clathrates (also referred to as hydrates), etc. The hydrocarbons may be discovered by hydrocarbon exploration processes.

The formation may also include at least one wellbore. For example, at least one wellbore may be drilled into the formation in order to confirm the presence of the hydrocarbons. As another example, at least one wellbore may be drilled into the formation in order to recover (also referred to as produce) the hydrocarbons. The hydrocarbons may be recovered from the entire formation or from a portion of the formation. For example, the formation may be divided into one or more hydrocarbon zones, and hydrocarbons may be recovered from each desired hydrocarbon zone. One or more of the hydrocarbon zones may even be shut-in to increase hydrocarbon recovery from a hydrocarbon zone that is not shut-in.

The formation, the hydrocarbons, or any combination thereof may also include non-hydrocarbon items. For example, the non-hydrocarbon items may include connate water, brine, tracers, items used in enhanced oil recovery or other hydrocarbon recovery processes, items from other treatments, etc.

In short, each formation may have a variety of characteristics, such as petrophysical rock properties, reservoir fluid properties, reservoir conditions, hydrocarbon properties, or any combination thereof. For example, each formation (or even zone or portion of the formation) may be associated with one or more of: temperature, porosity, salinity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, mineral, metal, etc.

The terms "formation", "subsurface formation", "hydrocarbon-bearing formation", "reservoir", "subsurface reservoir", "subsurface region of interest", "subsurface volume of interest", and the like may be used synonymously. The terms "formation", "hydrocarbons", and the like are not limited to any description or configuration described herein.

Wellbore: A wellbore refers to a single hole, usually cylindrical, that is drilled into the formation for hydrocarbon exploration, hydrocarbon recovery, surveillance, or any combination thereof. The wellbore is usually surrounded by the formation and the wellbore may be configured to be in fluidic communication with the formation (e.g., via perforations). The wellbore may also be configured to be in fluidic communication with the surface, such as in fluidic communication with a surface facility that may include oil/gas/water separators, gas compressors, storage tanks, pumps, gauges, sensors, meters, pipelines, etc.

The wellbore may be used for injection (sometimes referred to as an injection wellbore) in some embodiments. The wellbore may be used for production (sometimes referred to as a production wellbore) in some embodiments. The wellbore may be used for a single function, such as only injection, in some embodiments. The wellbore may be used for a plurality of functions, such as production then injection (or vice versa), in some embodiments. The use of the wellbore may also be changed, for example, a particular wellbore may be turned into an injection wellbore after a different previous use as a production wellbore. The wellbore may be drilled amongst existing wellbores, for example, as an infill wellbore. A wellbore may be utilized for injection and a different wellbore may be used for hydrocarbon production, such as in the scenario that hydrocarbons are swept from at least one injection wellbore towards at least one production wellbore and up the at least one production wellbore towards the surface for processing. On the other hand, a single wellbore may be utilized for injection and hydrocarbon production, such as a single wellbore used for hydraulic fracturing and hydrocarbon production. A plurality of wellbores (e.g., tens to hundreds of wellbores) are often used in a field to recover hydrocarbons.

The wellbore may have straight, directional, or a combination of trajectories. For example, the wellbore may be a vertical wellbore, a horizontal wellbore, a multilateral wellbore, an inclined wellbore, a slanted wellbore, etc. The wellbore may include a change in deviation. As an example, the deviation is changing when the wellbore is curving. In a horizontal wellbore, the deviation is changing at the curved section (sometimes referred to as the heel). As used herein, a horizontal section of a wellbore is drilled in a horizontal direction (or substantially horizontal direction). For example, a horizontal section of a wellbore is drilled towards (or substantially in parallel with) the bedding plane direction. A horizontal section of a wellbore may be, but is not limited to, a horizontal section of a horizontal wellbore. On the other hand, a vertical wellbore is drilled in a vertical direction (or substantially vertical direction). For example, a vertical wellbore is drilled perpendicular (or substantially perpendicular) to the bedding plane direction.

The wellbore may include a plurality of components, such as, but not limited to, a casing, a liner, a tubing string, a heating element, a sensor, a packer, a screen, a gravel pack, artificial lift equipment (e.g., an electric submersible pump (ESP)), etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the formation, producing a fluid from the formation, or any combination thereof. The casing may be cemented in place, with the cement positioned in the annulus between the formation and the outside of the casing. The wellbore may also include any completion hardware that is not discussed separately. If the wellbore is drilled offshore, the wellbore may include some of the previous components plus other offshore components, such as a riser.

The wellbore may also include equipment to control fluid flow into the wellbore, control fluid flow out of the wellbore, or any combination thereof. For example, each wellbore may include a wellhead, a blowout preventer (BOP), chokes, valves, or other control devices. These control devices may be located on the surface, under the surface (e.g., downhole in the wellbore), or any combination thereof. In some embodiments, the same control devices may be used to control fluid flow into and out of the wellbore. In some embodiments, different control devices may be used to control fluid flow into and out of the wellbore. In some embodiments, the rate of flow of fluids through the wellbore may depend on the fluid handling capacities of the surface facility that is in fluidic communication with the wellbore. The control devices may also be utilized to control the pressure profile of the wellbore.

The equipment to be used in controlling fluid flow into and out of the wellbore may be dependent on the wellbore, the formation, the surface facility, etc. However, for simplicity, the term "control apparatus" is meant to represent any wellhead(s), BOP(s), choke(s), valve(s), fluid(s), and other equipment and techniques related to controlling fluid flow into and out of the wellbore.

The wellbore may be drilled into the formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the wellbore.

The equipment to be used in drilling the wellbore may be dependent on the design of the wellbore, the formation, the hydrocarbons, etc. However, for simplicity, the term "drilling apparatus" is meant to represent any drill bit(s), drill string(s), drilling fluid(s), and other equipment and techniques related to drilling the wellbore.

The term "wellbore" may be used synonymously with the terms "borehole," "well," or "well bore." The term "wellbore" is not limited to any description or configuration described herein.

Hydrocarbon recovery: The hydrocarbons may be recovered (sometimes referred to as produced) from the formation using primary recovery (e.g., by relying on natural reservoir energy to recover the hydrocarbons), secondary recovery (e.g., by using water injection (also referred to as water-flooding) or natural gas injection to recover hydrocarbons), enhanced oil recovery (EOR), or any combination thereof. Enhanced oil recovery or simply EOR refers to techniques for increasing the amount of hydrocarbons that may be extracted from the formation, such as, but not limited to, chemical injection (sometimes referred to as chemical enhanced oil recovery (CEOR) or thermal recovery (which includes, for example, cyclic steam and steam flooding). Enhanced oil recovery may also be referred to as tertiary oil recovery. Secondary recovery is sometimes just referred to as improved oil recovery or enhanced oil recovery. The hydrocarbons may be recovered from the formation using a fracturing process. For example, a fracturing process may include fracturing using electrodes, fracturing using fluid (oftentimes referred to as hydraulic fracturing), etc. The hydrocarbons may be recovered from the formation using radio frequency (RF) heating. Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatments.

Simulator: The term "simulator" refers to a specialized computer system that utilizes a model (e.g., physics model) for mathematically representing or modeling an entity or environment under one or more scenarios (e.g., analyzing or estimating the performance or behavior of a hydrocarbon reservoir to forecast oil recovery based on various producing schemes, investigating potential rock failure such as in compacting reservoirs or in high-pressure injection operations, analysis of electromagnetic wave propagation through a medium during radio frequency generation while accounting for the temperature and water saturation of the medium). As used herein, the term simulator can be used to investigate interactions of reservoir flows, geomechanics, chemical reactions, electromagnetic or radio frequency heating, or other mechanisms impacting a hydrocarbon reservoir or areas surrounding the hydrocarbon reservoir (e.g., over-burden, under-burden, side-burden).

Physics Model: The term "physics model" refers to a mathematical representation or computer model that captures or are governed by the laws of physics (e.g., gravity, inertia, conservation of mass or energy). Physics models aim to be physically realistic. For example, the term "physics model" refers to a mathematical model describing physical phenomenon, such as fluid flow in the subsurface formation, geo-mechanical deformation, electromagnetic wave propagation, etc. depending on the particular model.

Globally Conservative: The term "globally conservative" is defined herein as a numerical scheme that maintains or keeps the weighted summation of a physics quantity the same over the entire overlapped part of two or more model domains/meshes before and after data mapping. For example, conservation of mass or energy of reservoir flow can be enforced on a global scale in a simulator over a time period (i.e., neither can be added or removed). The weights can be, for example, pore volume or bulk volume of the grid blocks, depending on the nature of the data.

Coupled: The term "coupled" is defined as two or more elements that co-operate or interact with each other. For example, two or more physics models, with the same or differing underlying physics, can be coupled together to arrive at a common solution that satisfies both models.

Other definitions: The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims. Further, while some of the below description is described in relation to coupling a reservoir simulator to another simulator (e.g., geo-mechanics simulator, an electromagnetic wave propagation simulator, or a chemical reaction simulator), one skilled in the art will understand that the coupling framework described herein can be utilized to couple any two or more types of simulators together. For example, the coupling framework could be utilized to couple a geo-mechanics simulator with an electromagnetic wave propagation simulator, a chemical reaction simulator, or both. Indeed, in some embodiments, if a first simulator is coupled with a second simulator, the first simulator and the second simulator may be of different types (e.g., the first simulator is a reservoir simulator and the second simulator is a geo-mechanics simulator, an electromagnetic wave propagation simulator, or a chemical reaction simulator). However, in some embodiments, if a first simulator is coupled with a plurality of simulators such as a second simulator and a third simulator, the first simulator and the plurality of simulators may be of different types but the plurality of simulators may be of the same type (e.g., the first simulator is a reservoir simulator, the second simulator is a geo-mechanics simulator, and the third simulator is a geo-mechanics simulator). In some embodiments, if a first simulator is coupled with a plurality of simulators such as a second simulator and a third simulator, the first simulator and the plurality of simulators may be of different types but the plurality of simulators may also be of different types (e.g., the first simulator is a reservoir simulator, the second simulator is a geo-mechanics simulator, and the third simulator is a chemical reaction simulator). Those of ordinary skill in the art will appreciate that the simulator examples provided herein are not exhaustive.

Unless defined otherwise, all technical and scientific terms used herein have the same meanings as commonly understood by one of skill in the art to which the disclosed invention belongs. All citations referred herein are expressly incorporated by reference.

Overview:

As discussed hereinabove, the three traditional approaches to coupling a reservoir simulator and an external simulator have a variety of disadvantages. On the other hand, embodiments consistent with this disclosure rely on a coupling framework for coupling a first simulator (e.g., a reservoir simulator) and at least one other simulator without many of the disadvantages of the three traditional approaches.

One embodiment of a method of coupling a first simulator and a second simulator to simulate a coupled multi-physics model of a subsurface formation, where the first simulator comprises a first physics model and the first simulator is in a process and a memory space, comprises loading, by a coupling framework, the second simulator as a library into the process and the memory space with the first simulator to ensure that the first simulator and the second simulator share a common process and a common memory space. The second simulator comprises a second physics model. The embodiment of the method further comprises simulating, by the first simulator and library corresponding to the second simulator that are coupled by the coupling framework during the simulating step, a coupled multi-physics model of the subsurface formation to generate a solution satisfying the first physics model, the second physics model, and interaction between the first physics model and the second physics model. The coupled multi-physics model is comprised of the first physics model, the second physics model, and the interaction between the first physics model and the second physics model. The coupling framework performs the following during the simulating step to couple the first simulator and the library corresponding to the second simulator: (i) controls data exchange between the first simulator and the second simulator through the common memory space, (ii) controls execution of the first simulator and the second simulator responsive to the common process. For example, the coupling framework can receive feedback from the second simulator and alter execution of the first simulator responsive to the received feedback in the event of two-way coupling. The coupling framework can also map data between the first simulator and the second simulator in the event of grid misalignment. In one embodiment, the coupling framework maps the data in a globally conservative (e.g., mass, energy, etc.) manner between the first simulator and the second simulator in the event of grid misalignment.

In one embodiment, the coupling framework allows one-way coupling, two-way explicit coupling, two-way iterative coupling, or any combination thereof. In one embodiment, the coupling framework alters execution of the first simulator in response to feedback from the second simulator in the two-way explicit coupling, the two-way iterative coupling, or any combination thereof. In one embodiment, the coupling framework maps data between the first simulator and the second simulator in the event of grid misalignment. In one embodiment, the coupling framework maps the data in a globally conservative manner. In one embodiment, the coupling framework uses at least one application program interface (API) to control execution of the first simulator, the second simulator, or both the first simulator and the second simulator responsive to the common process.

In one embodiment, the coupling framework loads the second simulator as the shared library into a plurality of common processes and a plurality of common memory spaces with the first simulator to create the coupled multi-physics model of the subsurface formation.

In one embodiment, a plurality of simulators each comprising a physics model are loaded as a plurality of shared libraries by the coupling framework into the common process and the common memory space with the first simulator; and the coupling framework performs the following during the simulating to couple the first simulator and the plurality of shared libraries corresponding to the plurality of simulators: controls data exchange between the first simulator and the plurality of simulators through the common memory space; and controls execution of the first simulator and the plurality of simulators responsive to the common process. In one embodiment, the coupling framework loads the plurality of simulators as the plurality of shared libraries into a plurality of common processes and a plurality of common memory spaces with the first simulator to create the coupled multi-physics model of the subsurface formation.

In one embodiment, the coupling framework establishes a communication pattern between the plurality of common processes and the plurality of common memory spaces based on domain decompositions. In one embodiment, the coupling framework establishes one-way coupling, two-way explicit coupling, two-way iterative coupling, or any combination thereof for each of the plurality of common processes. In one embodiment, the plurality of common processes and the plurality of common memory spaces reside within a plurality of nodes. In one embodiment, the coupling framework uses a message passing interface (MPI) to: control the data exchange between the plurality of common processes; control the data exchange between the plurality of nodes; or any combination thereof.

In one embodiment, each simulator comprises a reservoir simulator, a geo-mechanical simulator, a chemical reaction simulator, or an electromagnetic wave propagation simulator.

Advantageously, those of ordinary skill in the art will appreciate that embodiments consistent with this disclosure provide a flexible coupling framework (serial or parallel) to couple a standalone first simulator and at least one external simulator to model different physics in a minimally intrusive manner. For example, those of ordinary skill in the art will appreciate that embodiments consistent with this disclosure may be utilized to extend simulation capabilities of existing reservoir simulators to model coupled problems involving interactions of reservoir flows and other physics, such as geomechanics, chemical reactions, electromagnetic/radio frequency heating, etc. By doing so, the simulations and the resulting solutions that satisfy the physics models of the reservoir simulator and the external simulator(s) as well as interaction between the physics models may be more accurate.

The improved simulations and the improved solutions may provide details of the subsurface that were not previously known or known poorly. The improved simulations and the improved solutions may be utilized to improve hydrocarbon exploration and improve hydrocarbon production, such as in the areas of fracturing (e.g., hydraulic fracturing), thermal recovery (e.g., steamflooding, SAGD), etc. Moreover, those of ordinary skill in the art will appreciate that there are many decisions (e.g., steering decisions, landing decisions, completion decisions, etc.) to make in the hydrocarbon industry and making proper decisions based on more accurate simulations and more accurate resulting solutions according to the principles of the present disclosure should improve the likelihood of safe and reliable operations.

Advantageously, embodiments consistent with this disclosure may be utilized to generate production forecasts for practically any type of hydrocarbon such as, but not limited to, oil production and gas production. Embodiments consistent with this disclosure may be utilized to generate production forecasts for practically any type of production such as, but not limited to, cumulative production and estimated ultimate recovery (EUR). The embodiments consistent with this disclosure may be utilized to forecast hydrocarbon production of a wellbore drilled in a conventional formation. The embodiments consistent with this disclosure may be utilized to forecast hydrocarbon production of a wellbore drilled in an unconventional formation. The more accurate production forecasts may enable better development planning, economic outlook, reserve estimates, and business decisions, reservoir management decisions (e.g., selection and execution of hydrocarbon recovery processes), especially for unconventional and tight rock reservoirs.

Advantageously, embodiments consistent with this disclosure may lead to more accurate characterization of reserves, which may be utilized in the trading strategy.

Advantageously, embodiments consistent with this disclosure may be utilized to mitigate risks, optimize productivity of a producing hydrocarbon bearing formation, and drive reservoir management decisions. (1) As an example, embodiments consistent with this disclosure may be utilized to couple a reservoir simulator with a geomechanics simulator to understand the flow and deformation interaction to mitigate risks associated with the surface/seafloor, wellbore integrity, caprock integrity, sand production, fines migration, fault reactivation, etc. (2) As an example, embodiments consistent with this disclosure may be utilized to couple a reservoir simulator with a chemical reaction simulator to include reaction kinetics in reservoir flow simulation to improve forecast accuracy for hydrocarbon recovery processes involving complex fluid chemistry. (3) As another example, the embodiments consistent with this disclosure may be utilized to couple a reservoir simulator with an electromagnetics simulator to model radio frequency heating to explore the new recovery mechanism to increase production for heavy oil assets.

System: FIG. 1A illustrates one embodiment of a system, such as a computing system 100A, of coupling a first simulator 115 and a second simulator 135 by a coupling framework 130 to simulate a coupled multi-physics model of a subsurface formation, where the first simulator 115 comprises a first physics model and the first simulator is in a process 120 and a memory space 125. As will be described, the disclosed coupling framework 130 can be used to couple any two or more simulators comprising different physics models. For example, the first simulator 115 and the second simulator 135 can comprise any combination of reservoir simulators, geo-mechanical simulators, chemical reaction simulators, and electromagnetic wave propagation simulators. Further, while only two simulators are depicted in FIG. 1A, one skilled in the art will appreciate that more than two simulators comprising different physics models (e.g., 3 or 4 simulators) can be coupled via the coupling framework 130.

The computing system 100A includes at least one processor 105 communicatively connected to at least one memory 110 via a data bus. The processor 105 may be any of a variety of types of programmable circuits capable of executing computer-readable instructions to perform various tasks, such as mathematical and communication (e.g., input/output) tasks. While processor 105 is depicted in FIG. 1A as a single central processing unit (CPU), the processor 105 can contain multiple CPUs (e.g., 2, 4, 6) each containing a single or multiple cores (e.g., 2, 4, 8, 10, 12, 16, 32, 64, etc.). The computing system 100A may comprise a computer, a phone, a tablet, a laptop, a wireless device, a wired device, a plurality of networked devices, etc. In some embodiments, the computing system 100A represents at least one computer. In some embodiments, the computing system 100A represents one computing node in a network cluster or in a cloud computing system.

The memory 110 may include any of a variety of memory devices, such as using various types of computer-readable or computer storage media. A computer storage medium or computer-readable medium may be any medium that can contain or store the program for use by or in connection with the instruction execution system, apparatus, or device. In example embodiments, the computer storage medium is embodied as a computer storage device, such as a memory. In particular embodiments, the computer-readable media and computer storage media of the present disclosure comprise at least some tangible devices, and in specific embodiments such computer-readable media and computer storage media include exclusively non-transitory media. By way of example, the memory 110 may comprise dynamic random access memory (DRAM) or variants thereof. In FIGS. 1A-1B and 2A-2B, the memory (e.g., memory 110, memory 210, memory 260) utilized by the coupling framework for data exchange is DRAM or variants thereof. By using DRAM, some of the disadvantages, such as slow data exchange via hard drives, of the traditional second approach may be avoided.

Some embodiments may include other types of storage (not shown), such as mass storage devices, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. However, these other types of storage are in essence similar to "hard drives" and not utilized by the coupling framework for data exchange in FIGS. 1A-1B and 2A-2B. However, these other types of storage (not shown) may include instructions (e.g., computer-executable instructions), programs, etc. for the method of coupling a first simulator and a second simulator to simulate a coupled multi-physics model of a subsurface formation, and the processer 105 loads the instructions, the programs, etc. and data from these other types of storage/ "hard drives" to the memory 110.

In the illustrated embodiment, the memory 110 stores the first simulator 115 in the process 120 and the memory space 125. For example, the first simulator 115 is stored in the process 120, and the process 120 is stored in the memory space 125 of the memory 110. The memory 110 also stores a coupling framework 130 of the first simulator 115. The memory 110 stores computer-executable instructions which, when executed, cause the processor 105 to perform loading, by the coupling framework 130 of the first simulator 115, the second simulator 135 as a library into the process 120 and the memory space 125 of the first simulator 115 to ensure that the first simulator 115 and the second simulator 135 share a common process (i.e. the process 120) and a common memory space (i.e., the memory space 125). The first simulator 115 comprises a first physics model and the second simulator 135 comprises a second physics model.

In one embodiment, the first simulator 115 or the second simulator 135 comprise a reservoir simulator. In one embodiment, the first simulator 115 or the second simulator 135 comprise a geo-mechanical simulator. In one embodiment, the first simulator 115 or the second simulator 135 comprise a chemical reaction simulator, such as reaction kinetics or equilibrium. In one embodiment, the first simulator 115 or the second simulator 135 comprise an electromagnetic wave propagation simulator. Any reservoir simulator, any geo-mechanical simulator, any chemical reaction simulator, or any electromagnetic wave propagation simulator may be utilized, such as those that are commercially available. For example, the reservoir simulator may be, but is not limited to, the Intersect™ (IX) reservoir simulator that is commercially available from the Schlumberger Technology Corporation. The geo-mechanical simulator may be, but is not limited to, the geo-mechanical simulator discussed in the following items (a) U.S. Pat. No. 8,548,783, (b) U.S. Pat. No. 9,026,419, (c) U.S. Pat. No. 8,204,727, (d) Zuluaga, E., Schmidt, J. H., & Dean, R. H. (2007, January 1). The Use of a Fully Coupled Geomechanics-Reservoir Simulator To Evaluate the Feasibility of a Cavity Completion. Society of Petroleum Engineers. SPE 109588, pages 1-6, (e) Dean, R. H., & Schmidt, J. H. (2008, January 1). Hydraulic Fracture Predictions With a Fully Coupled Geomechanical Reservoir Simulator. Society of Petroleum Engineers. SPE 116470, pages 1-12, and (f) Li, G., Guan, X., Wang, H., Du, S., Wu, D., & Chen, J. (2019, March 29). Simulation of Radio Frequency Heating of Heavy Oil Reservoir Using Multi-Physics Coupling of Reservoir Simulation with Electromagnetic Solver. Society of Petroleum Engineers. SPE 193836. pages 1-23, each of which is incorporated by reference herein. A first simulator (e.g., a reservoir simulator) may even be coupled during the simulation with a different type of simulator(s) that is not listed herein.

The memory 110 stores computer-executable instructions which, when executed, cause the processor 105 to perform simulating, by the first simulator 115 and the library corresponding to the second simulator 135 that are coupled by the coupling framework 130 during the simulating step, a coupled multi-physics model of the subsurface formation to generate a solution satisfying the first physics model of the first simulator 115, the second physics model of the second simulator 135, and interaction between the first physics model of the first simulator 115 and the second physics model of the second simulator 135. The coupled multi-physics model is comprised of the first physics model of the first simulator 115, the second physics model of the second simulator 135, and the interaction between the first physics model of the first simulator 115 and the second physics model of the second simulator 135.

The coupling framework 130 performs the following during the simulating step to couple the first simulator 115 and the library corresponding to the second simulator 135: (i) controls data exchange between the first simulator 115 and the second simulator 135 through the common memory space (i.e., the memory space 125) and (ii) controls execution of the first simulator 115 and second simulator 135 responsive to the common process 120. For example, the coupling framework 130 can receive feedback from the second simulator 135 and alter execution of the first simulator 115 responsive to the received feedback in the event of two-way coupling. In embodiments, the coupling framework 130 maps data between the first simulator 115 and the second simulator 135 in the event of grid misalignment. In one embodiment, the coupling framework 130 maps the data in a globally conservative (e.g., mass, energy, etc.) manner between the first simulator 115 and the second simulator 135 in the event of grid misalignment. Regarding item (ii), the coupling framework 130 can use at least one application program interface (API), such as an API defined by a developer, to control execution of the second simulator 135. In some embodiments, altering execution of the first simulator and mapping data between the first simulator 115 and second simulator 135 is not performed by the coupling framework 130 during each simulation. For example, in some embodiments the coupling framework 130 alters execution of the first simulator 115 responsive to the received feedback in the event of two-way coupling, but the coupling framework 130 does not alter execution of the first simulator 115 in the event of one-way coupling. The coupling framework 130 allows one-way coupling (i.e., no feedback from the second simulator 135), two-way explicit coupling, two-way iterative coupling, or any combination thereof. As another example, in some embodiments the coupling framework 130 maps data between the first simulator 115 and the second simulator 135 in the event of grid misalignment, but the coupling framework 130 does not map data in the event that the grids are aligned. The coupled multi-physics model is simulated serially in FIG. 1A. FIG. 1A illustrates a completely serial simulation.

Those of ordinary skill in the art will appreciate that various modifications may be made to the serial implementation of FIG. 1A. For example, the single process 120 in the single memory space 125 is illustrated for simplicity, but a separate second process in its respective second memory space, a separate third process in its respective third memory space, and so on, may be simulated serially in FIG. 1A. In this case, for example, there is no communication between any two/pairs of these separate processes, therefore, each separate process is independent of others. As another example, the coupling may change at different time steps of a particular simulation, such that one type of coupling (e.g., one-way coupling) may be utilized in some time steps of the particular simulation and at least one other type of coupling (e.g., two-way explicit coupling) may utilized in some other time steps of the particular simulation. In one embodiment, one-way coupling may be utilized in some time steps of a particular simulation and two-way iterative coupling may be utilized in some other time steps of the particular simulation. In one embodiment, two-way explicit coupling may be utilized in some time steps of a particular simulation and two-way iterative coupling may be utilized in some other time steps of the particular simulation. In one embodiment, two-way explicit coupling may be utilized in some time steps of a particular simulation, two-way iterative coupling may be utilized in some other time steps of the particular simulation, and one-way coupling may be utilized in some other time steps of the particular simulation.

Figure 1B:
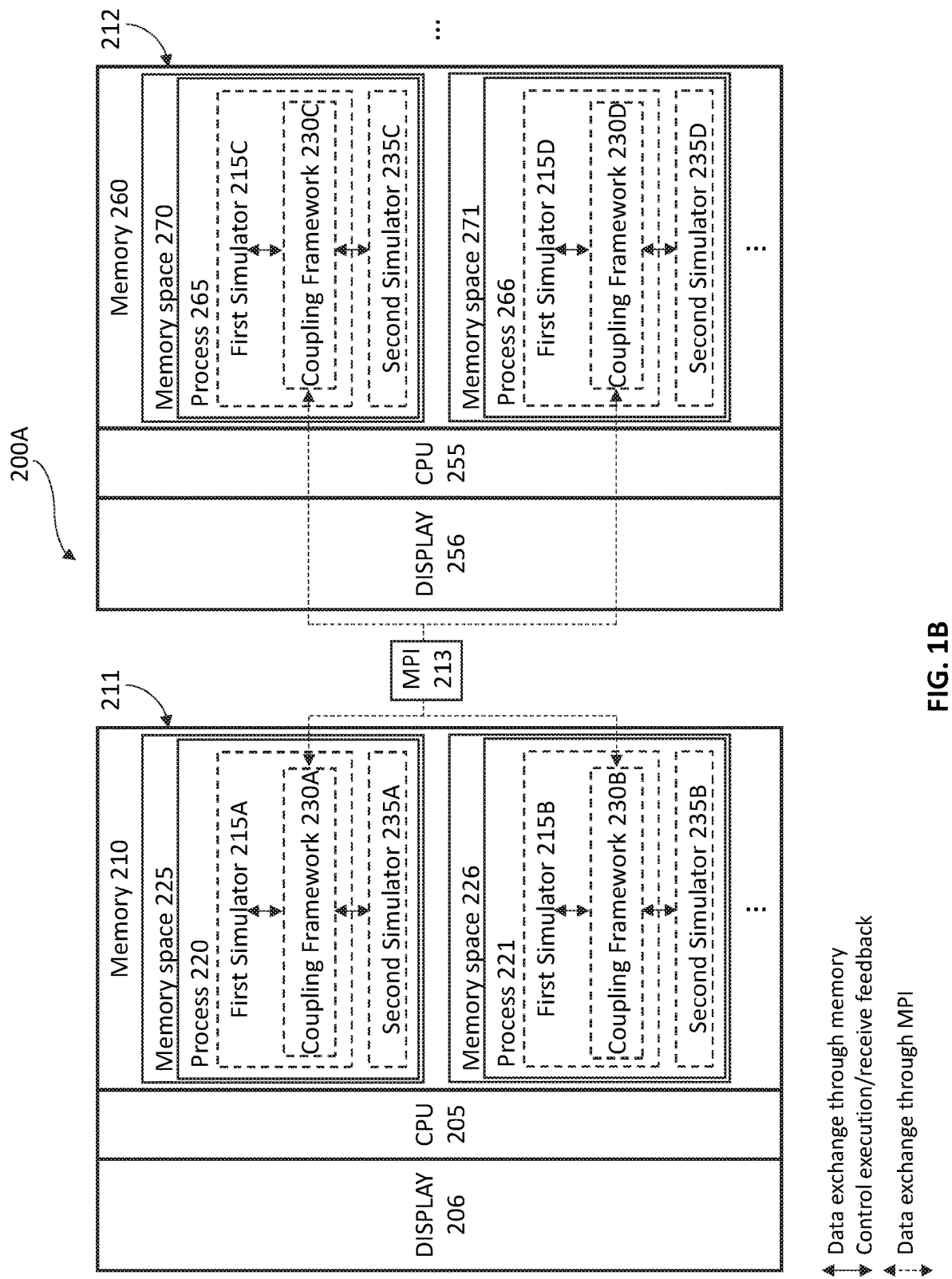
FIG. 1B illustrates one embodiment of a system of coupling a first simulator and a second simulator to simulate, in parallel, a coupled multi-physics model of a subsurface formation.

Although a particular simulation may be simulated completely in serial in one embodiment, a particular simulation may be simulated completely in parallel in a different embodiment. The coupled multi-physics model is simulated in parallel in FIG. 1B. FIG. 1B illustrates a completely parallel simulation.

Turning to FIG. 1B, a system 200A comprises a plurality of nodes, such as a node 211 and a node 212. While FIG. 1B only illustrates two nodes, one skilled in the art appreciates that additional computational nodes may be utilized. Each node includes a process in a respective memory space similar to FIG. 1A, and more specifically, a plurality of these are illustrated in each node of FIG. 1B. Turning to the node 211, the computing system 200A includes at least one processor 205 (similar to the processor 105 of FIG. 1A) communicatively connected to at least one memory 210 (similar to the memory 110 of FIG. 1A) via a data bus. The memory 210 stores a first simulator 215 (similar to the first simulator 115 of FIG. 1A) in a process 220 (similar to the process 120 of FIG. 1A) and a memory space 225 (similar to the memory space 125 of FIG. 1A). For example, the first simulator 215A is stored in the process 220, and the process 220 is stored in the memory space 225 of the memory 210. The memory 210 also stores a coupling framework 230A (similar to the coupling framework 130 of FIG. 1A) of the first simulator 215A.

The memory 210 stores computer-executable instructions which, when executed, cause the processor 205 to perform loading, by the coupling framework 230A of the first simulator 215A, a second simulator 235A (similar to the second simulator 135 of FIG. 1A) as a library into the process 220 and the memory space 225 of the first simulator 215A to ensure that the first simulator 215A and the second simulator 235A share a common process (i.e. the process 220) and a common memory space (i.e., the memory space 225). The first simulator 215A comprises a first physics model and the second simulator 235A comprises a second physics model.

The memory 210 stores computer-executable instructions which, when executed, cause the processor 205 to perform simulating, by the first simulator 215A and the library corresponding to the second simulator 235A that are coupled by the coupling framework 230A during the simulating step, a coupled multi-physics model of the subsurface formation to generate a solution satisfying the first physics model of the first 215A, the second physics model of the second simulator 235A, and interaction between the first physics model of the first simulator 215A and the second physics model of the second simulator 235A. The coupled multi-physics model is comprised of the first physics model of the first simulator 215A, the second physics model of the second simulator 235A, and the interaction between the first physics model of the first simulator 215A and the second physics model of the second simulator 235A.

The coupling framework 230A performs the following during the simulating step to couple the first simulator 215A and the library corresponding to the second simulator 235A: (i) controls data exchange between the first simulator 215A and the second simulator 235A through the common memory space (i.e., the memory space 225), and (ii) controls execution of the first simulator 215A and second simulator 235A responsive to the common process (i.e., process 120). For example, the coupling framework 230A can receive feedback from the second simulator 235A and alter execution of the first simulator 215A responsive to the received feedback in the event of two-way coupling. In embodiments, the coupling framework 230A maps data between the first simulator 215A and the second simulator 235A in the event of grid misalignment. In one embodiment, the coupling framework 230A maps the data in a globally conservative (e.g., mass, energy, etc.) manner between the first simulator 215 and the second simulator 235A in the event of grid misalignment. Regarding item (ii), the coupling framework 230A can use at least one application program interface (API), such as an API defined by a developer, to control execution of the second simulator 235A. In some embodiments, altering execution of the first simulator 215A and mapping data between the first simulator 215A and second simulator 235A is not performed by the coupling framework 230A during each simulation (e.g., if no grid misalignment, then data does not need to be mapped).

In the illustrated embodiment, the computing system 200A also includes a process 221 and its associated configuration that is similar to the process 220 and its associated configuration. For example, first simulator 215B is stored in the process 221, and the process 221 is stored in a memory space 226 of the memory 210. The memory 210 also stores a coupling framework 230B of the first simulator 215B. The memory 210 stores computer-executable instructions which, when executed, cause the processor 205 to perform the loading step by coupling framework 230B of the first simulator 215B, as well as perform simulating step, by the first simulator 215B and the library corresponding to a second simulator 235B that are coupled by the coupling framework 230B during the simulating step.

Turning to the node 212 of the computing system 200A, the node 212 is similar to the node 211 of the computing system 200A. The node 212 comprises at least one processor 255 (similar to the processor 205) communicatively connected to at least one memory 260 (similar to the memory 210) via a data bus. In some embodiment, the processor 255 of the node 212 may be the processor 205 of the node 211. In some embodiments, the memory 260 of the node 212 may be the memory 210 of the node 211.

In the illustrated embodiment, the node 212 also includes a process 265 and its associated configuration that is similar to the process 220 and its associated configuration. A first simulator 215C is stored in the process 265, and the process 265 is stored in a memory space 270 of the memory 260. The memory 260 also stores a coupling framework 230C of the first simulator 215C. The memory 260 stores computer-executable instructions which, when executed, cause the processor 255 to perform the loading step by the coupling framework 230C of the first simulator 215C, as well as perform the simulating step, by the first simulator 215C and the library corresponding to a second simulator 235C that are coupled by the coupling framework 230C during the simulating step.

In the illustrated embodiment, the node 212 also includes a process 266 and its associated configuration that is similar to the process 265 and its associated configuration. A first simulator 215D is stored in the process 266, and the process 266 is stored in a memory space 271 of the memory 260. The memory 260 also stores a coupling framework 230D of the first simulator 215D. The memory 260 stores computer-executable instructions which, when executed, cause the processor 255 to perform the loading step by the coupling framework 230D of the first simulator 215D, as well as perform the simulating step, by the first simulator 215D and the library corresponding to a second simulator 235D that are coupled by the coupling framework 230D during the simulating step.

In a parallel simulation, such as in FIG. 1B, the coupling framework 230 (i.e., 230A, 230B, 230C, & 230D) uses a message passing interface (MPI) 213 to: control data exchange between a plurality of processes such as the processes 220, 221, 265, 266; control data exchange between a plurality of nodes such as the nodes 211, 212; or any combination thereof. In some embodiments, the coupling framework 230 establishes a communication pattern between a plurality of processes such as the processes 220, 221, 265, 266 and a plurality of nodes such as the nodes 211, 212 based on domain decomposition of the first physics model of the first simulator (such as the first simulator 215A) and domain decomposition of the second physics model of the second simulator (such as the second simulator 235A), where the domain decompositions are independent. In some embodiments, the coupling framework 230 establishes a communication pattern between a plurality of processes such as the processes 220, 221, 265, 266 and a plurality of nodes such as the nodes 211, 212 based on domain decomposition of the first physics model of the first simulator (such as the first simulator 215A) and domain decomposition of the second physics model of the second simulator (such as the second simulator 235A), where the domain decompositions are dependent. This discussion regarding MPI 213 applies to each coupling framework 230 (i.e., 230A, 230B, 230C, & 230D) and each of the coupling frameworks 230 may use the MPI 213 to: control data exchange between a plurality of processes such as the processes 220, 221, 265, 266; control data exchange between a plurality of nodes such as the nodes 211, 212; or any combination thereof.

Figure 2A:
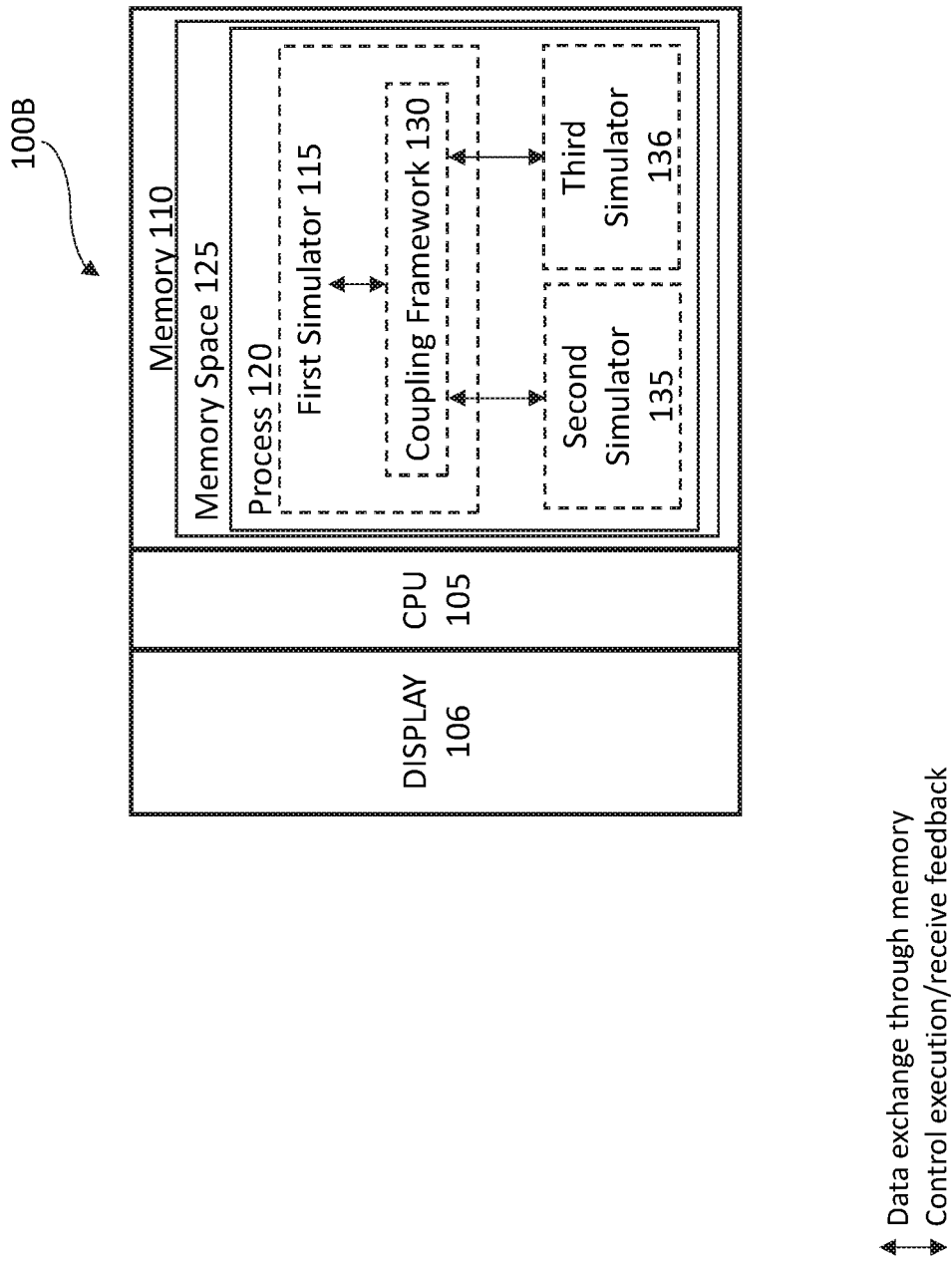
FIG. 2A illustrates one embodiment of a system of coupling a first simulator and a plurality of simulators to simulate, in serial, a coupled multi-physics model of a subsurface formation.
Figure 2B:
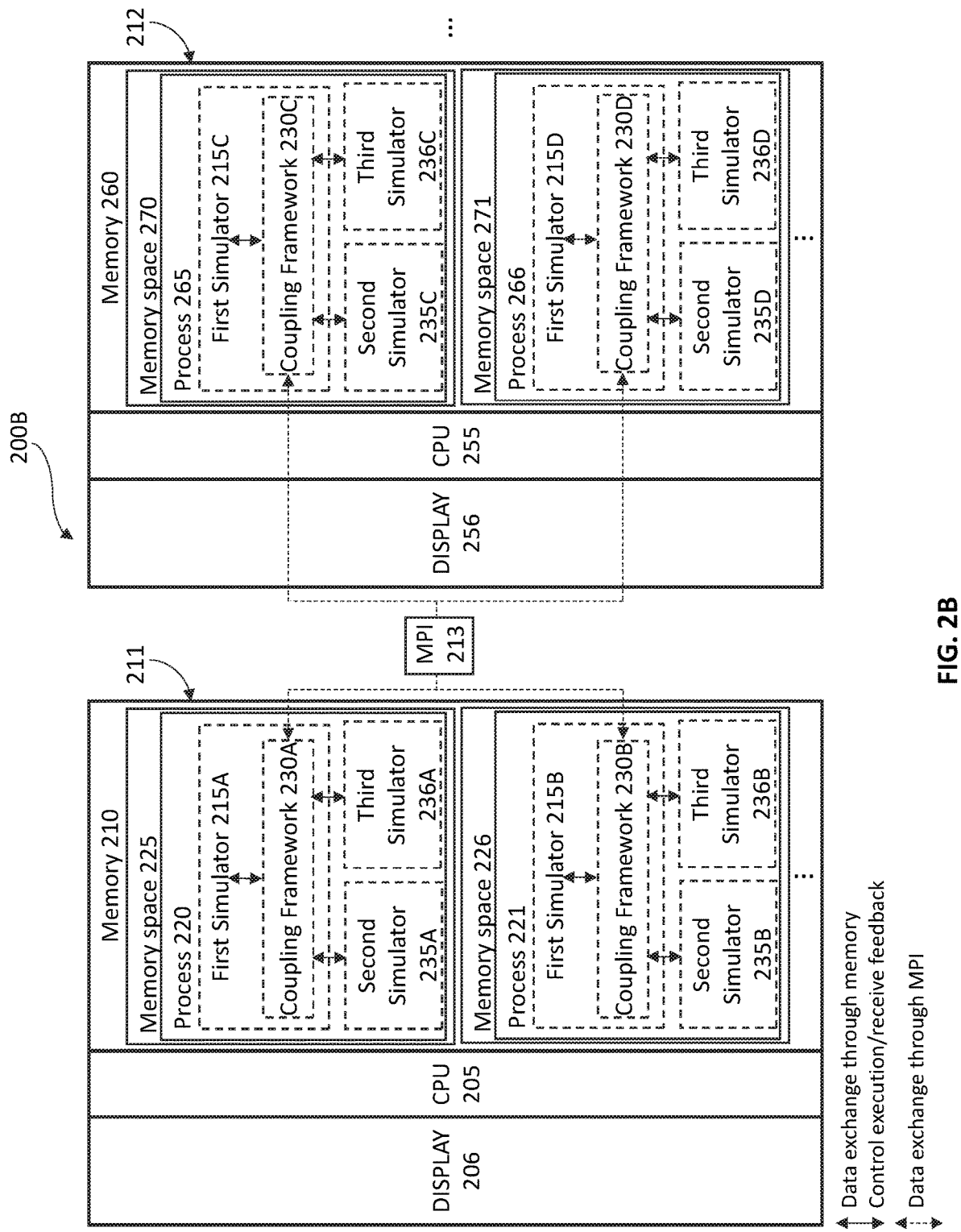
FIG. 2B illustrates one embodiment of a system of coupling a first simulator and a plurality of simulators to simulate, in parallel, a coupled multi-physics model of a subsurface formation.

Turning to FIGS. 2A-2B, FIG. 2A is similar to FIG. 1A and FIG. 2B is similar to FIG. 1B except that a third simulator is illustrated in FIGS. 2A-2B. Regarding the serial simulation, in FIG. 2A, the coupled multi-physics model is simulated by system 100B in serial with the first simulator 115 and two or more simulators. For example, in FIG. 2A, the process 120 illustrates the first simulator 115 and two or more simulators such as the second simulator 135 and a third simulator 136.

Regarding the parallel simulation by system 200B, in FIG. 2B, the coupled multi-physics model is simulated in parallel with a first simulator 115 and two or more simulators. For example, in FIG. 2B, the node 211 illustrates the first simulator 215A, the second simulator 235A, and a third simulator 236A in the process 220, as well as the first simulator 215B, the second simulator 235B, and a third simulator 236B in the process 221. Moreover, in FIG. 2B, the node 212 illustrates the first simulator 215C, the second simulator 235C, and a third simulator 236C in the process 265, as well as the first simulator 215D, the second simulator 235D, and a third simulator 236D in the process 266.

Referring to the process 220 of the node 211, a plurality of simulators such as the second simulator 235A and the third simulator 236A are loaded as libraries by the coupling framework 230A into the process 220 and the memory space 225 of the first simulator 215A to ensure that the first simulator 215A and the plurality of simulators 235A, 236A share the common process (i.e., the process 220) and the common memory space (i.e., the memory space 225). Each simulator of the plurality of simulators comprises a physics model.

Furthermore, the first simulator 215A and the plurality of libraries corresponding to the plurality of simulators 235A, 236A are coupled by the coupling framework 230A during the simulating step and the coupled multi-physics model of the subsurface formation generates the solution satisfying the first physics model of the first simulator 215A, the physics models of the plurality of simulators 235A, 236A, and interaction between the first physics model of the first simulator 215A and the physics models of the plurality of simulators 235A, 236A. The coupled multi-physics model is comprised of the first physics model of the first simulator 215A, the physics models of the plurality of simulators 235A, 236A, and the interaction between the first physics model of the first simulator 215A and the physics models of the plurality of simulators 235A, 236A. The coupling framework 230A performs the following during the stimulating step to couple the first simulator 215A and the libraries corresponding to the plurality of simulators 235A, 236A: (i) controls data exchange between the first simulator 215A and the plurality of simulators 235A, 236A through the common memory space (i.e., the memory space 225), and (ii) controls execution of the first simulator 215A and the plurality of simulators 235A, 236A responsive to the common process (i.e., the process 220). In embodiments, the coupling framework 230A receives feedback from the plurality of simulators 235A, 236A and alters execution of the first simulator 215A responsive to the received feedback in the event of two-way coupling. In embodiments, the coupling framework 230A, maps data between the first simulator 215A and the plurality of simulators 235A, 236A in the event of grid misalignment. In one embodiment, the coupling framework 230A maps the data in a globally conservative (e.g., mass, energy, etc.) manner between the first simulator 215A and the plurality of simulators 235A, 236A in the event of grid misalignment.

Each of the first simulator 215 (i.e., 215A, 215B, 215C, & 215D) and the plurality of simulators 235, 236 (i.e., 235A, 235B, 235C, 235D, 236A, 236B, 236C, 236D) can comprise a reservoir simulator, a geo-mechanical simulator, a chemical reaction simulators, an electromagnetic wave propagation simulator, or other physics-based simulator, however, coupling a first simulator and a plurality of simulators of different types may improve the accuracy of the coupled multi-physics model of the subsurface formation and the simulation. For example, the first simulator 215 can be a reservoir simulator and in one embodiment, the plurality of simulators comprises a geo-mechanical simulator and a chemical reaction simulator. In another embodiment, the plurality of simulators comprises a geo-mechanical simulator and an electromagnetic wave propagation simulator. In another embodiment, the plurality of simulators comprises a chemical reaction simulator and an electromagnetic wave propagation simulator. In another embodiment, the plurality of simulators comprises a geo-mechanical simulator, a chemical reaction simulator, and an electromagnetic wave propagation simulator. In another embodiment, the plurality of simulators may be of the same type (e.g., all of the plurality of simulators are geo-mechanical simulators), but the first simulator is of a type that is different than the first simulator (e.g., the first simulator is not a geo-mechanical simulator and the first simulator is a reservoir simulator, a chemical reaction simulator, or an electromagnetic wave propagation simulator).

Additionally, the computing systems 100A, 100B, 200A, and 200B may also include displays 106, 206, 256, respectively, for presenting a visual output or a user interface associated with the simulation, such as presenting a visual output of the solution that is generated from the simulation (e.g., the solution satisfying the first physics model of the first simulator 115, the second physics model of the second simulator 135, and interaction between the first physics model of the first simulator 115 and the second physics model of the second simulator 135 for viewing by one or more users as in FIG. 1A). The display 256 may be the same as the display 206 in the computing system 200 (i.e., 200A and 200B). In some embodiments, the simulation may be initiated with a simulation application. In some embodiments, the computing systems 100A, 100B, 200A, and 200B may include additional components, such as peripheral I/O devices, for example to allow a user to interact with user interfaces. For example, the displays 106, 206, 256 and the peripheral I/O devices may allow a user to provide user input, view and/or manipulate visual output, or other functionality. Some embodiments may include an operating system (not shown) that includes procedures for handling various basic system services and for performing hardware dependent tasks. Some embodiments may include: a network communication module (not shown) that facilitates communication with other devices via a communication network interface(s) (wired or wireless) and one or more communication networks, such as the Internet, other wide area networks, local area networks, metropolitan area networks, and so on. Some embodiments may include a communication interface(s) (not shown) such that any of the data or processed data products may be transmitted via the communication interface(s) or the network interface and may be stored. Moreover, as indicated hereinabove, other types of storage (not shown) may include instructions (e.g., computer-executable instructions), programs, etc. for the method of coupling a first simulator and at least one simulator to simulate a coupled multi-physics model of a subsurface formation, and a processor (e.g., the processor 105)

loads the instructions, the programs, etc. and data from these other types of storage/"hard drives" to the respective memory (e.g., the memory 110). In short, those of ordinary skill in the art will appreciate that various modifications may be made to the embodiments provided herein and the scope of the claims is not limited to the discussion herein. Embodiments of the present disclosure can be implemented as a system (e.g., a computer, a computing system, etc.), a method (e.g., a process, a computer process or a computer implemented method, etc.), an article of manufacture (e.g., computer readable medium or computer storage medium), software, etc.

Figure 3:
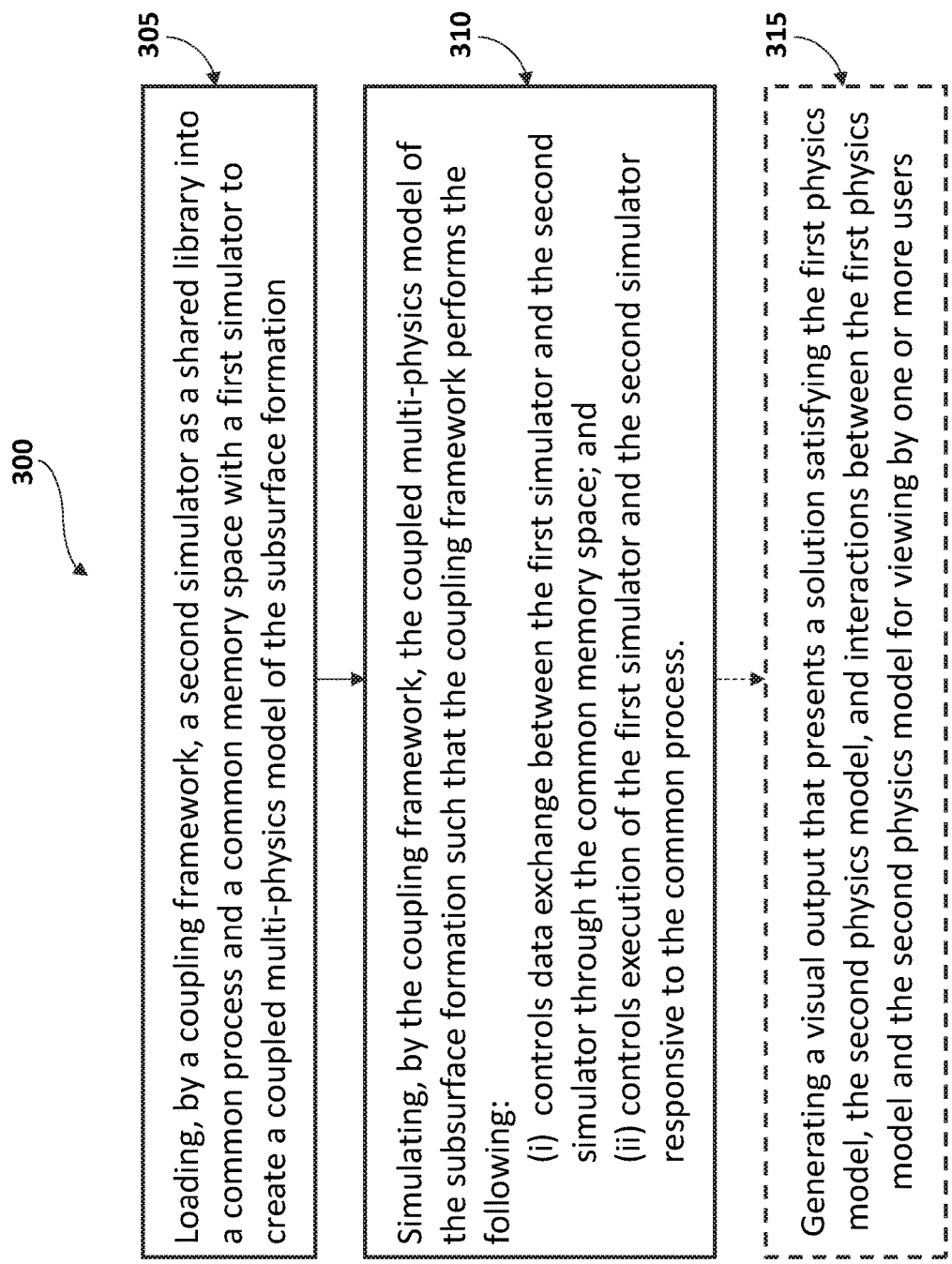
FIG. 3 illustrates one embodiment of a method of coupling a first simulator and a second simulator to simulate a coupled multi-physics model of a subsurface formation.

Simulating/Coupling:

Turning to FIG. 3, this figure illustrates one embodiment of a method 300 of coupling a first simulator and a second simulator (or plurality of simulators) to simulate a coupled multi-physics model of a subsurface formation. The first simulator comprises a first physics model and the first simulator is in a process and a memory space. The discussion refers to reference numbers in FIGS. 1A-1B. In one embodiment, the method 300 may be implemented via a simulation module with at least one sub-module, such as loading sub-module for 305, a simulating sub-module for 310, and a generating visual output sub-module for 315. One or more of these sub-modules may receive or retrieve data from a data sub-module, and one or more of these sub-modules may communicate with another sub-module. However, those of ordinary skill in the art will appreciate that various embodiments may be implemented in other ways.

At 305, the method 300 comprises loading, by a coupling framework, the second simulator as a library into a process and a memory space with the first simulator to ensure that the first simulator and the second simulator share a common process and a common memory space. The second simulator comprises a second physics model. For example, the library can be built using the first simulator extensibility header files. As discussed hereinabove, the coupling framework 130 of FIG. 1A serves as an abstract interface that allows the first simulator 115 to exchange data with an external simulator, such as the second simulator 135, through memory, such as the memory space 125. The external simulator may be compiled as a dynamic link library (or shared library for Linux) and the external simulator may be loaded at runtime as needed. For example, the external simulator(s) (e.g., geomechanic, electromagnetic, chemical, and others) may be built as a dynamic linking library (e.g., .dll files for Windows OS) or shared object library (e.g., .so files for Linux OS) with their modules wrapped using the coupling framework 130. The design allows for the coupling framework 130 to load an external library corresponding to an external simulator, or a plurality of external libraries corresponding to a plurality of external simulators, in a simulation run. This methodology also allows the first simulator 115 to be coupled with other 3rd party software libraries without exposing internal workings of the first simulator 115 to 3rd party developers and vice versa.

At 310, the method 300 comprises simulating, by the coupling framework, the coupled multi-physics model of the subsurface formation to generate a solution satisfying the first physics model, the second physics model, and interaction between the first physics model and the second physics model. The coupled multi-physics model is comprised of the first physics model, the second physics model, and the interaction between the first physics model and the second physics model. The coupling framework performs the following during the stimulating step to couple the first simulator and the library corresponding to the second simulator:

(i) controls data exchange between the first simulator and the second simulator through the common memory space, and (ii) controls execution of the first simulator and the second simulator responsive to the common process. This can include receiving feedback from the second simulator and altering execution of the first simulator responsive to the received feedback in the event of two-way coupling, and mapping data between the first simulator and the second simulator in the event of grid misalignment. In one embodiment, the coupling framework maps the data in a globally conservative (e.g., mass, energy, etc.) manner between the first simulator and the second simulator in the event of grid misalignment.

As an example, the coupling framework 130 controls data exchange between the first simulator 115 and the second simulator 135 through the common memory space (i.e., the memory space 125) by passing array pointers to the second simulator 135. The in-memory data exchange methodology incurs minimal computational overhead and makes it scalable for large scale parallel simulation.

As an example, the coupling framework 130 can use at least one API to control execution of the external simulator, such as the second simulator 135. The coupling framework 130 includes coded logic and at least one API defined by a developer, and the library that is loaded adheres to the defined API(s). For example, the external simulator implements the virtual methods in the coupling framework 130 that will be called by the first simulator 115 at different access points.

At run time, the first simulator 115 serves as the controller for the coupled simulation and the coupling framework 130 of the first simulator 115 loads the dynamic linking or shared object library(ies) and calls specific functions defined by the coupling framework 130, which in turn cause the coupling framework 130 to exchange data with and execute corresponding modules in the external simulators. In short, the coupling framework 130, as a part of the first simulator 115, loads external simulator library(ies), controls data exchange and calls external simulator(s) to execute particular modules. The coupling framework 130 also includes a globally conservative (e.g., mass, energy, etc.) mapping layer that interpolates and exchanges data through memory between the two simulators allowing the reservoir mesh to be non-aligned with the mesh of the external simulator, and the reservoir subdomain on each computational process to be non-aligned with the corresponding external simulator subdomain.

For each run of a coupled model, the user will specify in the input file what external simulators to load, the input files for these external simulators, the coupling scheme (one-way, two-way explicit, two-way iterative), the mode for grid data mapping (aligned or nonaligned), and other parameters (e.g., period/convergence tolerance of coupling).

In a parallel simulation, the same set of parallel computation processes may be utilized for both the first simulator and the external simulator(s) with the coupling framework 230 in FIG. 1B between them. Each computation process owns a subdomain of the first physics model and a subdomain of each external model. These different types of subdomains on each process do not need to overlap or use the same mesh and are depicted in FIGS. 1B and 2B with the notation A, B, C, and D. The subdomains of the first model do not need to be spatially contiguous. Likewise, the subdomains of each external model do not need to be spatially contiguous. Data exchange between the subdomains of the first model and the subdomains of each external model is taken care of by the coupling framework 230 in memory and through the network to achieve scalable performance. Data exchange between the subdomains of the first model is optional and is taken care of by the first simulator when needed. Data exchange between the subdomains of each external model is optional and is taken care of by the corresponding external simulator when needed.

In the parallel simulation, as in FIG. 1B, the coupling framework 230 (i.e., 230A, 230B, 230C, & 230D) uses a message passing interface (MPI) 213 to: control data exchange between a plurality of processes such as the processes 220, 221, 265, 266; control data exchange between a plurality of nodes such as the nodes 211, 212; or any combination thereof. In some embodiments, the coupling framework 230 establishes a communication pattern between a plurality of processes such as the processes 220, 221, 265, 266 and a plurality of nodes such as the nodes 211, 212 based on domain decomposition of the first physics model of the first simulator such as the first simulator 215A and domain decomposition of the second physics model of the second simulator such as the second simulator 235A, where the domain decompositions are independent. In some embodiments, the coupling framework 230 establishes a communication pattern between a plurality of processes such as the processes 220, 221, 265, 266 and a plurality of nodes such as the nodes 211, 212 based on domain decomposition of the first physics model of the first simulator such as the first simulator 215A and domain decomposition of the second physics model of the second simulator such as the second simulator 235A, where the domain decompositions are dependent. Thus, MPI is utilized for data communication between different processes within a node or different processes within different nodes, and direct data exchange through memory within the process. Moreover, the data exchange is hidden (in memory/MPI) behind the scene from the developer who develops the wrapper for the external simulator to be coupled to such that once set up is complete, it is very easy to use.

At optional step 315, the method 300 comprises generating a visual output that presents a solution satisfying the first physics model of the first simulator, the second physics model of the second simulator, and interaction between the first physics model of the first simulator and the second physics model of the second simulator (or solution satisfying the first physics model of the first simulator, the physics models of the plurality of simulators, and interaction between the first physics model of the first simulator and the physics models of the plurality of simulators) for viewing by one or more users. For example, the solution may be presented or displayed via the display 106. Visual output of at least one physics model may be presented or displayed via the display 106 in some embodiments.

In short, a first simulator may be coupled with at least one other simulator using a coupling framework. For example, the first simulator can be a reservoir simulator. For geomechanics coupling, the coupling framework allows both porosity and permeability coupling with a variety of coupling schemes. For electromagnetic wave propagation and chemical reaction (e.g., reaction kinetics) coupling, the coupling framework allows for iterative source term coupling. The coupling framework may also be utilized to efficiently model multi-physics problems through coupling with different external simulator(s), such as, but not limited to: (a) coupling a reservoir simulator and an external geo-mechanics simulator to understand flow and geo-mechanical deformation interaction; (b) coupling a reservoir simulator and a chemical reaction simulator to include reaction kinetics in reservoir flow simulation to improve forecast accuracy, and/or (c) coupling a reservoir simulator and an electromagnetic wave propagation simulator to model radio frequency heating to optimize production. In some embodiments, a reservoir simulator may even be coupled with a geo-mechanics simulator, an electromagnetic wave propagation simulator, and a chemical reaction simulator (e.g., reaction kinetics) simultaneously. With the flexibility of the coupling framework, it is possible to couple a first simulator with external simulators modeling other physics as necessary in the future. Moreover, the principles of the present disclosure may be utilized for large scale, full-fidelity applications such that an existing standalone simulator and the externally linked simulation models do not need to be simplified for coupling purposes, as has been the case for many previous applications.

Example

The flexibility, capabilities, and performance of the coupling framework may be illustrated by the coupling between a reservoir simulator and an external geomechanics simulator. For this type of coupling, the interpolation between the flow and geomechanics subdomains may be bulk volume or pore volume weighted, depending on the nature of the property to be mapped. For a dual porosity system, the properties for the matrix and the fracture system may be mapped separately. In each coupling step or iteration, pressure, temperature, and fluid body forces are passed through the coupling framework from the reservoir simulator to the geomechanics simulator before the geomechanics solution, while the reservoir porosity, pore compressibility, pore thermal expansion coefficient, and permeability multipliers are passed through the coupling framework from the geomechanics simulator to the reservoir simulator after the geomechanics solution to update the flow solution. By controlling the direction and frequency of the data exchange and convergence criteria of the coupled solution, one-way, two-way explicit, and two-way iterative coupling schemes are achieved. The coupled reservoir and geomechanics simulations enabled by the coupling framework exhibit improved parallel scalability on large scale (>10 million mesh elements) models with highly heterogeneous properties. They also exhibit high efficiency and accuracy in interpolating and exchanging data between non-aligned reservoir and geomechanics domains/meshes.

Figure 4:
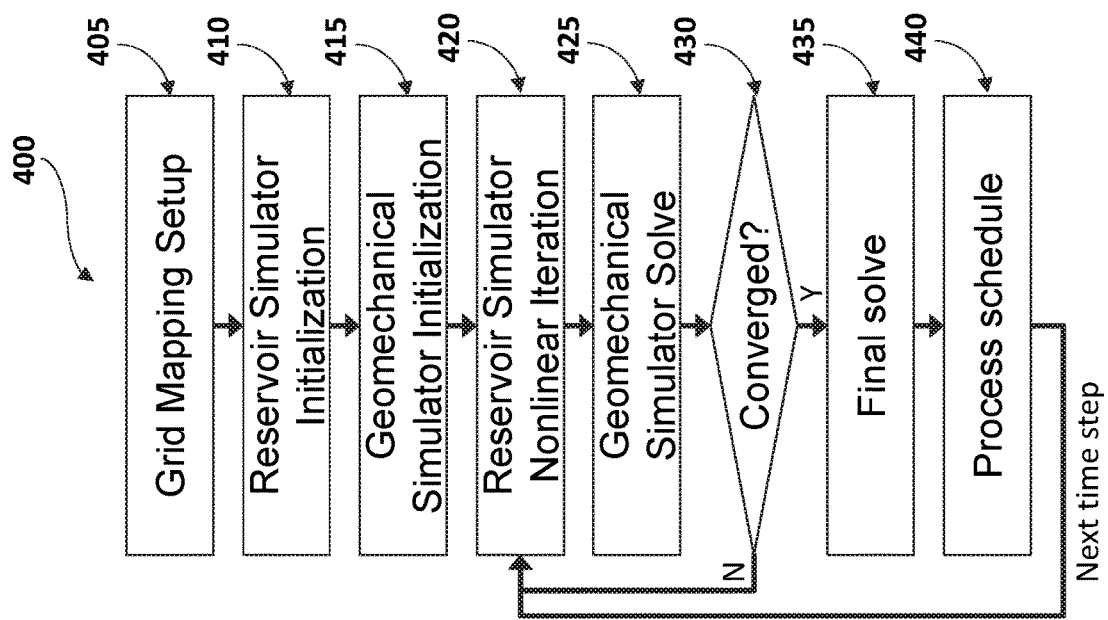
FIG. 4 illustrates an embodiment in which a coupling framework is applied between a reservoir simulator and a geomechanics simulator.
Figure 5B:
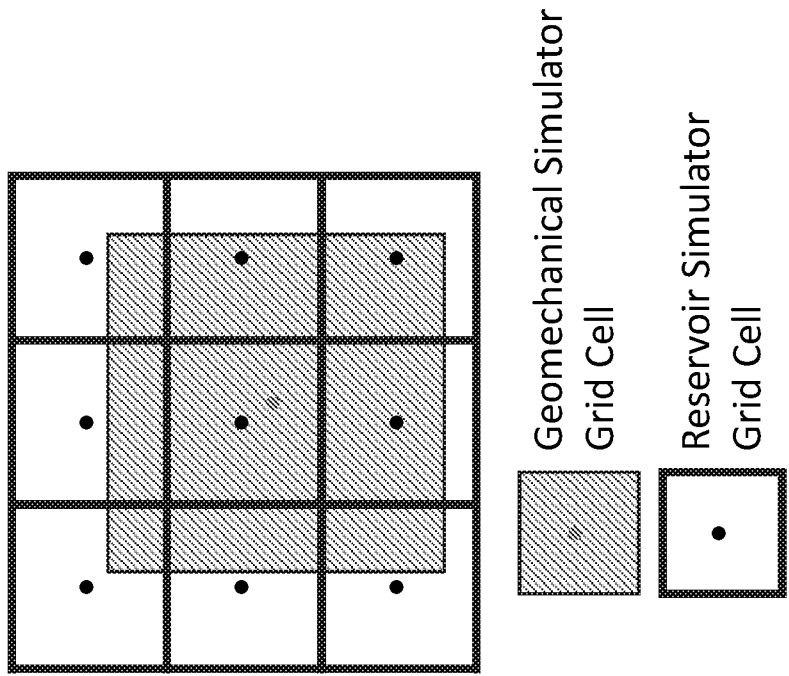
FIG. 5B illustrates an example of nonaligned grid mapping (e.g., nonaligned grid cells).
Figure 5A:
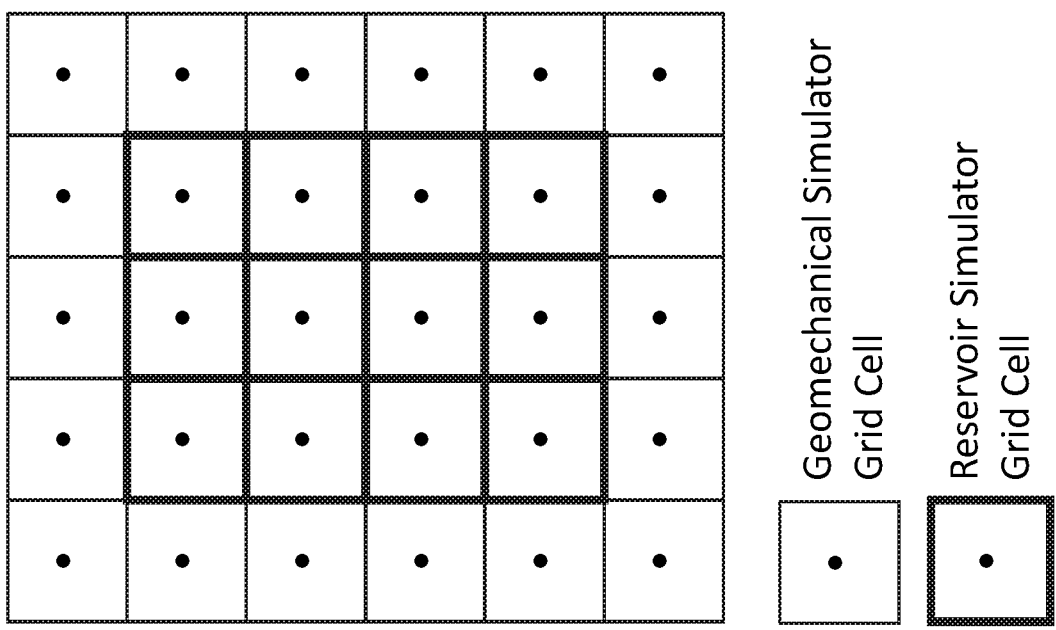
FIG. 5A illustrates an example of aligned grid mapping (e.g., aligned grid cells).

FIG. 4 illustrates an embodiment where the above coupling framework is applied between a reservoir simulator and a geomechanics simulator. Process 400 shows example steps as the coupling framework is utilized. In step 405, a grid mapping module sets up a communication pattern and mapping coefficients between the reservoir simulator and the geomechanical simulator. Domain decomposition of reservoir and geomechanical simulator grids can be performed independently in respective simulators. Partitioned geomechanical simulator domains can be exchanged to allow for better overlapping with reservoir simulator domains. Once set up, the communication pattern is fixed and all subsequent MPI communications are handled by the grid mapping module behind the scene. The user can define the mode for grid data mapping (aligned or nonaligned). For aligned grid mapping, the geomechanical grid occupying corresponding region(s) is compared to the reservoir simulator grid. A binary search tree (e.g., k-d tree) can be constructed using the geomechanical grid cell center coordinates to search for the corresponding geomechanical simulator and reservoir simulator grid cells. Each geomechanical domain may or may not contain reservoir simulation grid cells. Likewise, each reservoir domain may or may not contain geomechanics grid cells. The resulting array containing mapped geomechanical grid cells can be used as the mapping coefficient. For non-aligned grid cells, mapped properties can be calculated as weighted sums of source properties. To compute mapping coefficients, reservoir simulation cells corresponding to geomechanical cells (and vice versa) can be quickly filtered using a k-d tree. Each pair of nearby cells can be tested to see whether they intersect, e.g., using Boolean Gilbert-Johnson-Keerthi (BGJK) algorithm, and an intersection polyhedral can be created for each pair of intersecting cells. The (bulk) volume of each intersection polyhedral can then be calculated and normalized as the mapping coefficient. Examples of aligned and nonaligned grids are illustrated in FIGS. 5A and 5B, respectively.

In step 410, the reservoir simulator is initialized. Here, the reservoir simulator passes array pointers for mapped properties and overlapped geomechanical grid cells to the geomechanical simulator. This can be done through an API. The user can also define the coupling scheme (one-way, two-way explicit, two-way iterative), and other parameters (e.g., period/convergence tolerance of coupling) in the input files for these external simulators. In step 415, the geomechanical simulator is initialized. Here, the reservoir simulator maps initial data (e.g., p=pressure, T=temperature, $\rho\_mix$=density of fluid mixture, and $\phi$=porosity) into geomechanical arrays via API, the geomechanical simulator does an initialization solve, and reservoir simulation data (e.g., pore volume compressibilities, permeability multiplier) derived from the initial solution are mapped back to reservoir simulator arrays via the API. For non-aligned grids, bulk volume weighting can be applied to $\phi$ and T, and pore volume weighting can be applied to P and $\rho\_mix$ when mapping from the reservoir simulator to the geomechanical simulator. Similarly, bulk volume weighting can be applied to $\phi$ (or its change ratio) and permeability multipliers (or their change ratios), and pore volume weighting can be applied to pore volume compressibilities when mapping from the geomechanical simulator to the reservoir simulator.

In step 420, the reservoir simulator performs nonlinear iteration such that the reservoir simulator maps data into the geomechanical arrays and communicates with the geomechanical simulator via API (iterative coupling). The geomechanical simulator can solve geomechanics equations, report convergence flag, and updates reservoir simulation data ($\phi$, pore volume compressibilities, permeability multiplier), which are then mapped back to reservoir simulator arrays via the API in step 425. The reservoir simulator and geomechanical simulator continue iterations in step 420 and step 425 until convergence is reached in step 430. A final solve is then performed in step 435, and at the end of the timestep, the reservoir simulator maps data into geomechanical arrays and communicates to the geomechanical simulator to solve geomechanics equations via the API (one-way or explicit coupling). The geomechanical simulator then updates and maps reservoir simulation data ($\phi$, pore volume compressibilities, permeability multiplier) back to reservoir simulator arrays via the API (explicit coupling). The reservoir and geomechanical simulators can save results or cut timesteps. Finally, in step 440, the geomechanical simulator reads time-dependent data and outputs results if scheduled. Similarly, in step 440, the reservoir simulator reads time-dependent data and outputs results if scheduled. The framework proceeds to the next time step and this is repeated until the end of coupled simulation based on the process schedule.

Process 400 achieves good parallel scalability (data exchanged in memory or via MPI) and excellent efficiency/accuracy in mapping and exchanging data. Further, it is minimally intrusive as the simulators can be kept separate and the geomechanical simulator can be loaded at run time. It allows for versatile coupling schemes by controlling the direction and frequency of the data exchange and convergence criteria (one-way, two-way explicit and iterative) and flexible with grid mapping (aligned/nonaligned, independent domain sizes and decomposition). While applied to a reservoir and geomechanics simulator in this example, the coupling framework also enables multi-physics coupling with other external software libraries (e.g., reaction kinetics, electromagnetic solvers, etc.).

EXAMPLE EMBODIMENTS

Various example embodiments are provided below:

Embodiment 1

A method of coupling a first simulator and a second simulator to simulate a coupled multi-physics model of a subsurface formation, wherein the first simulator comprises a first physics model and the second simulator comprises a second physics model, the method comprising: loading, by a coupling framework, the second simulator as a shared library into a common process and a common memory space with the first simulator to create the coupled multi-physics model of the subsurface formation; and simulating, by the coupling framework, the coupled multi-physics model of the subsurface formation such that the coupling framework performs the following during the simulating to couple the first simulator and the shared library corresponding to the second simulator: controls data exchange between the first simulator and the second simulator through the common memory space; and controls execution of the first simulator and the second simulator responsive to the common process.

Embodiment 2

The method of Embodiment 1, wherein the coupling framework allows one-way coupling, two-way explicit coupling, two-way iterative coupling, or any combination thereof.

Embodiment 3

The method of Embodiment 2, wherein the coupling framework alters execution of the first simulator in response to feedback from the second simulator in the two-way explicit coupling, the two-way iterative coupling, or any combination thereof.

Embodiment 4

The method of any of Embodiments 1-3, wherein the coupling framework maps data between the first simulator and the second simulator in the event of grid misalignment.

Embodiment 5

The method of Embodiment 4, wherein the coupling framework maps the data in a globally conservative manner.

Embodiment 6

The method of any of Embodiments 1-5, wherein the coupling framework uses at least one application program interface (API) to control execution of the first simulator, the second simulator, or both the first simulator and the second simulator responsive to the common process.

Embodiment 7

The method of any of Embodiments 1-6, wherein the coupling framework loads the second simulator as the shared library into a plurality of common processes and a plurality of common memory spaces with the first simulator to create the coupled multi-physics model of the subsurface formation.

Embodiment 8

The method of any of Embodiments 1-6, wherein a plurality of simulators each comprising a physics model are loaded as a plurality of shared libraries by the coupling framework into the common process and the common memory space with the first simulator; and the coupling framework performs the following during the simulating to couple the first simulator and the plurality of shared libraries corresponding to the plurality of simulators: (i) controls data exchange between the first simulator and the plurality of simulators through the common memory space; and (ii) controls execution of the first simulator and the plurality of simulators responsive to the common process.

Embodiment 9

The method of Embodiment 8, wherein the coupling framework loads the plurality of simulators as the plurality of shared libraries into a plurality of common processes and a plurality of common memory spaces with the first simulator to create the coupled multi-physics model of the subsurface formation.

Embodiment 10

The method of any of Embodiments 7 or 9, wherein the coupling framework establishes a communication pattern between the plurality of common processes and the plurality of common memory spaces based on domain decompositions.

Embodiment 11

The method of any of Embodiments 7, 9, or 10, wherein the coupling framework establishes one-way coupling, two-way explicit coupling, two-way iterative coupling, or any combination thereof for each of the plurality of common processes.

Embodiment 12

The method of any of Embodiments 7, 9, or 10-11, wherein the plurality of common processes and the plurality of common memory spaces reside within a plurality of nodes.

Embodiment 13

The method of any of Embodiments 7, 9, or 10-12, wherein the coupling framework uses a message passing interface (MPI) to: control the data exchange between the plurality of common processes; control the data exchange between the plurality of nodes; or any combination thereof.

Embodiment 14

The method of any of Embodiments 1-13, wherein each simulator comprises a reservoir simulator, a geo-mechanical simulator, a chemical reaction simulator, or an electromagnetic wave propagation simulator.

Embodiment 15

A system of coupling a first simulator and a second simulator to simulate a coupled multi-physics model of a subsurface formation, wherein the first simulator comprises a first physics model and the second simulator comprises a second physics model, the system comprising: a processor; and a memory communicatively connected to the processor, the memory storing computer-executable instructions which, when executed, cause the processor to perform: loading, by a coupling framework, the second simulator as a shared library into a common process and a common memory space with the first simulator to create the coupled multi-physics model of the subsurface formation; and simulating, by the coupling framework, the coupled multi-physics model of the subsurface formation such that the coupling framework performs the following during the simulating to couple the first simulator and the shared library corresponding to the second simulator: (i) controls data exchange between the first simulator and the second simulator through the common memory space; and (ii) controls execution of the first simulator and the second simulator responsive to the common process.

Embodiment 16

The system of Embodiment 15, wherein the system further comprises at least one application program interface (API) used by the coupling framework to control execution of the first simulator, the second simulator, or both the first simulator and the second simulator responsive to the common process.

Embodiment 17

The system of any of Embodiments 15-16, wherein the coupling framework loads the second simulator as the shared library into a plurality of common processes and a plurality of common memory spaces with the first simulator to create the coupled multi-physics model of the subsurface formation.

Embodiment 18

The system of any of Embodiments 15-16, wherein a plurality of simulators each comprising a physics model are loaded as a plurality of shared libraries by the coupling framework into the common process and the common memory space; and the coupling framework performs the following during the simulating to couple the first simulator and the plurality of shared libraries corresponding to the plurality of simulators: (i) controls data exchange between the first simulator and the plurality of simulators through the common memory space; and (ii) controls execution of the first simulator and the plurality of simulators responsive to the common process.

Embodiment 19

The system of Embodiment 18, wherein the coupling framework loads the plurality of simulators as the plurality of shared libraries into a plurality of common processes and a plurality of common memory spaces with the first simulator to create the coupled multi-physics model of the subsurface formation.

Embodiment 20

The system of any of Embodiments 17 or 19, wherein the plurality of common processes and the plurality of common memory spaces reside within a plurality of nodes.

Embodiment 21

The system of any of Embodiments 17, 19, or 20, wherein the system further comprises a message passing interface (MPI) used by the coupling framework to: control the data exchange between the plurality of common processes; control the data exchange between the plurality of nodes; or any combination thereof.

Embodiment 22

The system of any of Embodiments 15-21, wherein each simulator comprises a reservoir simulator, a geo-mechanical simulator, a chemical reaction simulator, or an electromagnetic wave propagation simulator.

Embodiment 23

A computer-readable medium having computer-executable instructions stored thereon which, when executed by a computer, cause the computer to perform a method of coupling a first simulator and a second simulator to simulate a coupled multi-physics model of a subsurface formation, wherein the first simulator comprises a first physics model and the second simulator comprises a second physics model, the method comprising: loading, by a coupling framework, the second simulator as a shared library into a common process and a common memory space with the first simulator to create the coupled multi-physics model of the subsurface formation; and simulating, by the coupling framework, the coupled multi-physics model of the subsurface formation such that the coupling framework performs the following during the simulating to couple the first simulator and the shared library corresponding to the second simulator: (i) controls data exchange between the first simulator and the second simulator through the common memory space; and (ii) controls execution of the first simulator and the second simulator responsive to the common process.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method of coupling a first simulator and a second simulator to simulate a coupled multi-physics model of a subsurface formation, the method comprising:
   loading, by a coupling framework within the first simulator, the second simulator as a shared library into a plurality of common processes and a plurality of common memory spaces with the first simulator to create the coupled multi-physics model of the subsurface formation, wherein the first simulator is a standalone simulator comprising a first computational mesh and a first domain decomposition of the first computational mesh, wherein the second simulator is a standalone simulator comprising a second computational mesh and a second domain decomposition of the second computational mesh, wherein the second simulator is external to the first simulator, wherein the first simulator comprises a first physics model of the subsurface formation and the second simulator comprises a second physics model of the subsurface formation, wherein the first physics model and the second physics model overlap spatially and overlap temporally for the subsurface formation; and
   simulating, by the coupling framework, the coupled multi-physics model of the subsurface formation such that the coupling framework performs the following during the simulating to couple the first simulator and the shared library corresponding to the second simulator:
   (i) controls data exchange between the first simulator and the second simulator through the plurality of common memory spaces;
   (ii) controls execution of the first simulator and the second simulator responsive to the plurality of common processes;
   (iii) establishes a communication pattern between the plurality of common processes and the plurality of common memory spaces based on the first domain decomposition of the first computational mesh and the second domain decomposition of the second computational mesh; and
   (iv) maps data in a globally conservative manner between the first simulator and the second simulator in the event of grid misalignment.

2. The method of claim 1, wherein the coupling framework allows one-way coupling, two-way explicit coupling, two-way iterative coupling, or any combination thereof.

3. The method of claim 2, wherein the coupling framework alters execution of the first simulator in response to feedback from the second simulator in the two-way explicit coupling, the two-way iterative coupling, or any combination thereof.

4. The method of claim 1, wherein the coupling framework uses at least one application program interface (API) to control execution of the first simulator, the second simulator, or both the first simulator and the second simulator responsive to the plurality of common processes.

5. The method of claim 1, wherein a plurality of simulators, each comprising a corresponding physics model of the subsurface formation, a corresponding computational mesh, and a corresponding domain decomposition of the corresponding computational mesh, are loaded as a plurality of shared libraries by the coupling framework into the plurality of common processes and the plurality of common memory spaces with the first simulator; and the coupling framework performs the following during the simulating to couple the first simulator and the plurality of shared libraries corresponding to the plurality of simulators:
- (i) controls data exchange between the first simulator and the plurality of (i) simulators through the plurality of common memory spaces;
- (ii) controls execution of the first simulator and the plurality of simulators responsive to the plurality of common processes;
- (iii) establishes a communication pattern between the plurality of common processes and the plurality of common memory spaces based on the corresponding domain decompositions of the corresponding computational meshes; and
- (iv) maps data in a globally conservative manner between the first simulator and the plurality of simulators in the event of grid misalignment.

6. The method of claim 5, wherein the coupling framework loads the plurality of simulators as the plurality of shared libraries into the plurality of common processes and the plurality of common memory spaces with the first simulator to create the coupled multi-physics model of the subsurface formation.

7. The method of claim 1:
wherein the coupling framework loads the second simulator or a plurality of simulators, each comprising a corresponding physics model of the subsurface formation, a corresponding computational mesh, and a corresponding domain decomposition of the corresponding computational mesh, into the plurality of common processes and the plurality of common memory spaces with the first simulator to create the coupled multi-physics model of the subsurface formation; and
wherein the coupling framework establishes one-way coupling, two-way explicit coupling, two-way iterative coupling, or any combination thereof for each of the plurality of common processes.

8. The method of claim 1:
wherein the coupling framework loads the second simulator or a plurality of simulators, each comprising a corresponding physics model of the subsurface formation, a corresponding computational mesh, and a corresponding domain decomposition of the corresponding computational mesh, into the plurality of common processes and the plurality of common memory spaces with the first simulator to create the coupled multi-physics model of the subsurface formation; and
wherein the plurality of common processes and the plurality of common memory spaces reside within a plurality of nodes.

9. The method of claim 1:
wherein the coupling framework loads the second simulator or a plurality of simulators, each comprising a corresponding physics model of the subsurface formation, a corresponding computational mesh, and a corresponding domain decomposition of the corresponding computational mesh, into the plurality of common processes and the plurality of common memory spaces with the first simulator to create the coupled multi-physics model of the subsurface formation; and
wherein the coupling framework uses a message passing interface (MPI) to: control the data exchange between the plurality of common processes; control the data exchange between a plurality of nodes having the plurality of common processes and the plurality of common memory spaces; or any combination thereof.

10. The method of claim 1, wherein each simulator comprises a reservoir simulator, a geo-mechanical simulator, a chemical reaction simulator, or an electromagnetic wave propagation simulator.

11. A system of coupling a first simulator and a second simulator to simulate a coupled multi-physics model of a subsurface formation, the system comprising:
a processor; and
a memory communicatively connected to the processor, the memory storing computer-executable instructions which, when executed, cause the processor to perform:
loading, by a coupling framework within the first simulator, the second simulator as a shared library into a plurality of common processes and a plurality of common memory spaces with the first simulator to create the coupled multi-physics model of the subsurface formation, wherein the first simulator is a standalone simulator comprising a first computational mesh and a first domain decomposition of the first computational mesh, wherein the second simulator is a standalone simulator comprising a second computational mesh and a second domain decomposition of the second computational mesh, wherein the second simulator is external to the first simulator, wherein the first simulator comprises a first physics model of the subsurface formation and the second simulator comprises a second physics model of the subsurface formation, wherein the first physics model and the second physics model overlap spatially and overlap temporally for the subsurface formation; and
simulating, by the coupling framework, the coupled multi-physics model of the subsurface formation such that the coupling framework performs the following during the simulating to couple the first simulator and the shared library corresponding to the second simulator:
- (i) controls data exchange between the first simulator and the second simulator through the plurality of common memory space;
- (ii) controls execution of the first simulator and the second simulator responsive to the plurality of common processes;
- (iii) establishes a communication pattern between the plurality of common processes and the plurality of common memory spaces based on the first domain decomposition of the first computational mesh and the second domain decomposition of the second computational mesh; and
- (iv) maps data in a globally conservative manner between the first simulator and the second simulator in the event of grid misalignment.

12. The system of claim 11, wherein the system further comprises at least one application program interface (API) used by the coupling framework to control execution of the first simulator, the second simulator, or both the first simulator and the second simulator responsive to the plurality of common processes.

13. The system of claim 11, wherein a plurality of simulators, each comprising a corresponding physics model of the subsurface formation, a corresponding computational mesh, and a corresponding domain decomposition of the corresponding computational mesh, are loaded as a plurality of shared libraries by the coupling framework into the plurality of common processes and the plurality of common memory spaces; and the coupling framework performs the following during the simulating to couple the first simulator and the plurality of shared libraries corresponding to the plurality of simulators:
- (i) controls data exchange between the first simulator and the plurality of simulators through the plurality of common memory spaces;
- (ii) controls execution of the first simulator and the plurality of simulators responsive to the plurality of common processes;
- (iii) establishes a communication pattern between the plurality of common processes and the plurality of common memory spaces based on the corresponding domain decompositions of the corresponding computational meshes; and
- (iv) maps data in a globally conservative manner between the first simulator and the plurality of simulators in the event of grid misalignment.

14. The system of claim 13, wherein the coupling framework loads the plurality of simulators as the plurality of shared libraries into the plurality of common processes and the plurality of common memory spaces with the first simulator to create the coupled multi-physics model of the subsurface formation.

15. The system of claim 11:
wherein the coupling framework loads the second simulator or a plurality of simulators, each comprising a corresponding physics model of the subsurface formation, a corresponding computational mesh, and a corresponding domain decomposition of the corresponding computational mesh, into the plurality of common processes and the plurality of common memory spaces with the first simulator to create the coupled multi-physics model of the subsurface formation; and
wherein the plurality of common processes and the plurality of common memory spaces reside within a plurality of nodes.

16. The system of claim 15:
wherein the coupling framework loads the second simulator or a plurality of simulators, each comprising a corresponding physics model of the subsurface formation, a corresponding computational mesh, and a corresponding domain decomposition of the corresponding computational mesh, into the plurality of common processes and the plurality of common memory spaces with the first simulator to create the coupled multi-physics model of the subsurface formation; and
wherein the system further comprises a message passing interface (MPI) used by the coupling framework to: control the data exchange between the plurality of common processes; control the data exchange between a plurality of nodes having the plurality of common processes and the plurality of common memory spaces; or any combination thereof.

17. The system of claim 11, wherein each simulator comprises a reservoir simulator, a geo-mechanical simulator, a chemical reaction simulator, or an electromagnetic wave propagation simulator.

18. The method of claim 1,
wherein the first simulator comprises a first discretization technique and a first linear solver; and
wherein the second simulator comprises a second discretization technique and a second linear solver.

19. The system of claim 11, wherein the coupling framework allows one-way coupling, two-way explicit coupling, two-way iterative coupling, or any combination thereof.

20. The system of claim 19, wherein the coupling framework alters execution of the first simulator in response to feedback from the second simulator in the two-way explicit coupling, the two-way iterative coupling, or any combination thereof.

21. The system of claim 11:
wherein the coupling framework loads the second simulator or a plurality of simulators, each comprising a corresponding physics model of the subsurface formation, a corresponding computational mesh, and a corresponding domain decomposition of the corresponding computational mesh, into the plurality of common processes and the plurality of common memory spaces with the first simulator to create the coupled multi-physics model of the subsurface formation; and
wherein the coupling framework establishes one-way coupling, two-way explicit coupling, two-way iterative coupling, or any combination thereof for each of the plurality of common processes.

* * * * *